(12) United States Patent
Callaghan et al.

(10) Patent No.: US 7,693,581 B2
(45) Date of Patent: *Apr. 6, 2010

(54) APPLICATION AND SERVICE MANAGEMENT FOR INDUSTRIAL CONTROL DEVICES

(75) Inventors: David M. Callaghan, Concord, OH (US); Brian A. Batke, Novelty, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/764,702

(22) Filed: Jun. 18, 2007

(65) Prior Publication Data
US 2007/0293952 A1 Dec. 20, 2007

Related U.S. Application Data

(63) Continuation of application No. 11/141,527, filed on May 31, 2005, now Pat. No. 7,233,830.

(51) Int. Cl.
*G05B 15/02* (2006.01)
*G05B 19/18* (2006.01)
*G05B 13/02* (2006.01)
*G06F 15/16* (2006.01)
*G06F 17/30* (2006.01)

(52) U.S. Cl. .............. 700/9; 700/17; 700/19; 700/20; 700/49; 709/201; 709/217; 709/218; 709/219; 707/1; 707/8; 707/10

(58) Field of Classification Search .......... 700/9, 700/17–20, 26–28, 48–50, 104; 709/201, 709/217–220; 707/1, 8, 10
See application file for complete search history.

(56) References Cited

U.S. PATENT DOCUMENTS
4,570,217 A  2/1986  Allen et al.

(Continued)

FOREIGN PATENT DOCUMENTS
WO  0167196  9/2001

OTHER PUBLICATIONS
wikipedia definitions for RDF and URI.

(Continued)

*Primary Examiner*—Ramesh B Patel
(74) *Attorney, Agent, or Firm*—Turocy & Watson LLP; R. Scott Speroff

(57) ABSTRACT

The subject invention provides systems and methods that facilitate accessing and management of information (e.g., instructions, executables, classes, objects . . . ) associated with a control system. The systems and methods enable a control system entity the ability to leverage functionality of another control system entity, for example, to employ a service and/or execute an application within an execution environment of the other control system entity. Other capabilities include, but are not limited to, installing and uninstalling, registering and deregistering, loading and/or unloading instructions, commencing, pausing and terminating instruction execution, passing parameters and variables to instructions, modifying, overriding instructions and removing instructions, reliable messages, files, executables, classes, data structures, schema, objects, services, notifications, behaviors, alerts, etc. Optionally, a security mechanism can be utilized to determine the scope of access to the control system entity and/or instructions, applications, and services therein.

38 Claims, 19 Drawing Sheets

U.S. PATENT DOCUMENTS

| | | | |
|---|---|---|---|
| 4,771,606 A | 9/1988 | Mose et al. | |
| 5,068,778 A | 11/1991 | Kosem et al. | |
| 5,093,782 A | 3/1992 | Muraski et al. | |
| 5,296,851 A | 3/1994 | Ikuta et al. | |
| 5,537,548 A | 7/1996 | Fin et al. | |
| 5,602,936 A | 2/1997 | Green et al. | |
| 5,742,845 A | 4/1998 | Wagner | |
| 5,748,930 A | 5/1998 | Prakash | |
| 5,808,907 A | 9/1998 | Shetty et al. | |
| 5,832,221 A | 11/1998 | Jones | |
| 5,873,086 A | 2/1999 | Fujii et al. | |
| 5,933,347 A | 8/1999 | Cook et al. | |
| 5,950,006 A | 9/1999 | Crater et al. | |
| 5,960,200 A | 9/1999 | Eager et al. | |
| 5,963,448 A | 10/1999 | Flood et al. | |
| 6,032,154 A | 2/2000 | Coleman et al. | |
| 6,061,603 A | 5/2000 | Papadopoulos et al. | |
| 6,105,017 A | 8/2000 | Kleewein et al. | |
| 6,157,649 A | 12/2000 | Peirce et al. | |
| 6,170,044 B1 | 1/2001 | McLaughlin et al. | |
| 6,182,252 B1 | 1/2001 | Wong et al. | |
| 6,185,466 B1 | 2/2001 | Nicewonger | |
| 6,268,853 B1 | 7/2001 | Hoskins et al. | |
| 6,272,400 B1 | 8/2001 | Jankins et al. | |
| 6,282,454 B1 | 8/2001 | Papadopoulos et al. | |
| 6,298,377 B1 * | 10/2001 | Hartikainen et al. | 709/223 |
| 6,304,973 B1 | 10/2001 | Williams | |
| 6,311,149 B1 | 10/2001 | Ryan et al. | |
| 6,327,511 B1 | 12/2001 | Naismith et al. | |
| 6,345,259 B1 * | 2/2002 | Sandoval | 705/7 |
| 6,370,448 B1 | 4/2002 | Eryurek | |
| 6,389,470 B1 | 5/2002 | Barr | |
| 6,408,277 B1 | 6/2002 | Nelken | |
| 6,418,430 B1 | 7/2002 | DeFazio et al. | |
| 6,430,604 B1 | 8/2002 | Ogle et al. | |
| 6,434,157 B1 | 8/2002 | Dube et al. | |
| 6,453,210 B1 | 9/2002 | Belotserkovskiy et al. | |
| 6,463,352 B1 | 10/2002 | Tadokoro et al. | |
| 6,484,177 B1 | 11/2002 | Van Huben et al. | |
| 6,505,247 B1 * | 1/2003 | Steger et al. | 709/224 |
| 6,556,950 B1 | 4/2003 | Schwenke et al. | |
| 6,560,235 B1 | 5/2003 | Jones | |
| 6,564,212 B2 | 5/2003 | Koskas | |
| 6,587,900 B1 | 7/2003 | Wischinski | |
| 6,608,638 B1 | 8/2003 | Kodosky et al. | |
| 6,618,856 B2 | 9/2003 | Coburn et al. | |
| 6,633,883 B2 | 10/2003 | Koskas | |
| 6,662,118 B2 | 12/2003 | Carle et al. | |
| 6,684,238 B1 | 1/2004 | Dutta | |
| 6,701,314 B1 | 3/2004 | Conover et al. | |
| 6,728,262 B1 | 4/2004 | Woram | |
| 6,732,191 B1 | 5/2004 | Baker et al. | |
| 6,751,562 B1 | 6/2004 | Blackett et al. | |
| 6,760,782 B1 | 7/2004 | Swales | |
| 6,763,040 B1 | 7/2004 | Hite et al. | |
| 6,779,051 B1 | 8/2004 | Basil et al. | |
| 6,801,920 B1 | 10/2004 | Wischinski | |
| 6,802,053 B1 | 10/2004 | Dye et al. | |
| 6,810,429 B1 | 10/2004 | Walsh et al. | |
| 6,816,913 B1 | 11/2004 | Liebenow | |
| 6,819,960 B1 | 11/2004 | McKelvey et al. | |
| 6,822,945 B2 | 11/2004 | Petrovykh | |
| 6,832,118 B1 | 12/2004 | Heberfein et al. | |
| 6,842,779 B1 | 1/2005 | Mishizawa et al. | |
| 6,850,252 B1 | 2/2005 | Hoffberg | |
| 6,859,718 B2 | 2/2005 | Fritz et al. | |
| 6,862,553 B2 | 3/2005 | Schwenke et al. | |
| 6,865,596 B1 | 3/2005 | Barber et al. | |
| 6,891,849 B1 | 5/2005 | Jasperneite et al. | |
| 6,928,514 B2 | 8/2005 | Chatterjee et al. | |
| 6,931,429 B2 | 8/2005 | Gouge et al. | |
| 6,944,555 B2 | 9/2005 | Blackett et al. | |
| 6,950,848 B1 | 9/2005 | Yousefi'zadeh | |
| 6,957,112 B2 * | 10/2005 | Ina et al. | 700/96 |
| 6,975,913 B2 * | 12/2005 | Kreidler et al. | 700/96 |
| 6,993,456 B2 | 1/2006 | Brooks et al. | |
| 7,043,532 B1 | 5/2006 | Humpleman et al. | |
| 7,055,056 B2 | 5/2006 | Bessire | |
| 7,058,460 B2 | 6/2006 | Dolansky | |
| 7,058,712 B1 | 6/2006 | Vasko et al. | |
| 7,080,066 B1 | 7/2006 | Scheurich et al. | |
| 7,085,670 B2 | 8/2006 | Odom et al. | |
| 7,130,701 B1 * | 10/2006 | Wischinski | 700/65 |
| 7,151,966 B1 | 12/2006 | Baier et al. | |
| 7,162,510 B2 | 1/2007 | Jammes | |
| 7,162,534 B2 * | 1/2007 | Schleiss et al. | 709/232 |
| 7,168,075 B1 | 1/2007 | Barthel et al. | |
| 7,181,487 B1 | 2/2007 | Marbach, et al. | |
| 7,185,045 B2 | 2/2007 | Ellis et al. | |
| 7,194,446 B1 | 3/2007 | Bromley et al. | |
| 7,203,560 B1 | 4/2007 | Wylie et al. | |
| 7,206,643 B2 | 4/2007 | Ruutu et al. | |
| 7,216,043 B2 | 5/2007 | Ransom | |
| 7,216,109 B1 | 5/2007 | Donner | |
| 7,216,120 B2 | 5/2007 | Yoshida et al. | |
| 7,225,037 B2 | 5/2007 | Shani | |
| 7,233,830 B1 * | 6/2007 | Callaghan et al. | 700/9 |
| 7,248,978 B2 | 7/2007 | Ransom | |
| 7,251,535 B2 | 7/2007 | Farchmin et al. | |
| 7,266,476 B2 | 9/2007 | Coburn et al. | |
| 7,277,457 B2 | 10/2007 | Gorday et al. | |
| 7,293,038 B2 | 11/2007 | Blevins et al. | |
| 7,372,826 B2 | 5/2008 | Dahod et al. | |
| 7,395,122 B2 * | 7/2008 | Kreidler et al. | 700/18 |
| 7,457,815 B2 | 11/2008 | Hsu et al. | |
| 2002/0022982 A1 | 2/2002 | Cooperstone et al. | |
| 2002/0082736 A1 | 6/2002 | Lech et al. | |
| 2002/0087229 A1 | 7/2002 | Pasadyn et al. | |
| 2002/0116453 A1 | 8/2002 | Todorov et al. | |
| 2002/0120728 A1 | 8/2002 | Braatz et al. | |
| 2002/0124011 A1 | 9/2002 | Baxter et al. | |
| 2002/0133807 A1 | 9/2002 | Sluiman | |
| 2002/0156837 A1 | 10/2002 | Batke et al. | |
| 2002/0174161 A1 | 11/2002 | Scheetz et al. | |
| 2002/0174178 A1 | 11/2002 | Stawikowski | |
| 2002/0194365 A1 | 12/2002 | Jammes | |
| 2003/0014387 A1 | 1/2003 | Kreidler et al. | |
| 2003/0014500 A1 | 1/2003 | Schleiss et al. | |
| 2003/0023336 A1 | 1/2003 | Kriedler et al. | |
| 2003/0033376 A1 | 2/2003 | Brownhill et al. | |
| 2003/0035439 A1 | 2/2003 | Watanabe | |
| 2003/0051074 A1 | 3/2003 | Edwards | |
| 2003/0061384 A1 | 3/2003 | Nakatani | |
| 2003/0120803 A1 | 6/2003 | Loughran et al. | |
| 2003/0120817 A1 | 6/2003 | Ott et al. | |
| 2003/0140094 A1 | 7/2003 | Collier et al. | |
| 2003/0149718 A1 | 8/2003 | Theimer | |
| 2003/0154147 A1 | 8/2003 | Parry | |
| 2003/0208595 A1 | 11/2003 | Gouge et al. | |
| 2004/0010627 A1 | 1/2004 | Ellis et al. | |
| 2004/0025060 A1 | 2/2004 | Raffaele et al. | |
| 2004/0039468 A1 | 2/2004 | Zahorack et al. | |
| 2004/0057662 A1 | 3/2004 | Morfino | |
| 2004/0081197 A1 | 4/2004 | Liu | |
| 2004/0107345 A1 | 6/2004 | Brandt et al. | |
| 2004/0111512 A1 | 6/2004 | Barth | |
| 2004/0117624 A1 | 6/2004 | Brandt et al. | |
| 2004/0153171 A1 * | 8/2004 | Brandt et al. | 700/9 |
| 2004/0153508 A1 | 8/2004 | Alcorn et al. | |
| 2004/0153819 A1 | 8/2004 | Bjorsne et al. | |
| 2004/0193439 A1 | 9/2004 | Marrott | |
| 2004/0201602 A1 | 10/2004 | Mody et al. | |
| 2004/0225402 A1 | 11/2004 | Chang et al. | |
| 2004/0259531 A1 | 12/2004 | Wood et al. | |

| | | | |
|---|---|---|---|
| 2005/0010311 A1 | 1/2005 | Barbazette et al. |
| 2005/0021676 A1 | 1/2005 | Chambers et al. |
| 2005/0038853 A1 | 2/2005 | Blanc et al. |
| 2005/0039040 A1 | 2/2005 | Ransom et al. |
| 2005/0042999 A1 | 2/2005 | Rappaport |
| 2005/0074036 A1 | 4/2005 | Gorday et al. |
| 2005/0103767 A1 | 5/2005 | Kainec et al. |
| 2005/0131551 A1 | 6/2005 | Ruutu et al. |
| 2005/0138432 A1 | 6/2005 | Ransom et al. |
| 2005/0144186 A1 | 6/2005 | Hesselink et al. |
| 2005/0144616 A1 | 6/2005 | Hammond et al. |
| 2005/0177709 A1 | 8/2005 | Kim |
| 2005/0188351 A1 | 8/2005 | Hoefler et al. |
| 2005/0198138 A1 | 9/2005 | Heller et al. |
| 2005/0216897 A1 | 9/2005 | Amrhein et al. |
| 2005/0273205 A1 | 12/2005 | Nickerson et al. |
| 2006/0002356 A1 | 1/2006 | Barany et al. |
| 2006/0010318 A1 | 1/2006 | Coley et al. |
| 2006/0026672 A1 | 2/2006 | Braun |
| 2006/0031447 A1 | 2/2006 | Holt et al. |
| 2006/0041661 A1 | 2/2006 | Erikson et al. |
| 2006/0059253 A1 | 3/2006 | Goodman et al. |
| 2006/0080409 A1 | 4/2006 | Bieber |
| 2006/0108411 A1 | 5/2006 | Macurek et al. |
| 2006/0129690 A1 | 6/2006 | Hill et al. |
| 2006/0155865 A1 | 7/2006 | Brandt et al. |
| 2006/0178760 A1 | 8/2006 | Mann et al. |
| 2006/0259634 A1 | 11/2006 | Hood et al. |
| 2006/0287746 A1 | 12/2006 | Braithwaite et al. |
| 2007/0135947 A1 | 6/2007 | Bromley et al. |
| 2007/0234339 A1 | 10/2007 | Kostadinov |

OTHER PUBLICATIONS

European Search Report dated Mar. 29, 2004 for European Patent Application Serial No. EP03026338, 3 Pages.
Von Siegfried Staiger. Objektorientierte Planung und Abwicklung von Fertigungsauftragen, Geislingen/Steige, Oct. 1995.
Amnon Barak, et al., Performance of PVM with the MOSIX Preemptive Process Migration Scheme, Proc. 7th Israeli Conf. on Computer Systems and Software Engineering, Jun. 1996, 8 pages.
V. Ramesh, et al., A Methodology for Interschema Relationship Identification in Heterogeneous Databases, Proceedings of the 28th Annual Hawaii International Conference on System Sciences, 1995, 10 pages.
Wikipedia, "RS-232", http://en.wikipedia.org/wili/RS-232.
Wikipedia, http://en.wikipedia.org/wiki/EoIP.
OA Dated Jun. 25, 2008 for U.S. Appl. No. 11/065,953, 21 pages.
Wikipedia Definition for "Controller" http://en.wikipedia.org/wiki/Controller_%28_theory%29.
Wikipedia Definition for "Protocol Stack" http://en.wikipedia.org/wiki/Protocol_Stack.
OA Dated Jul. 1, 2008 for U.S. Appl. No. 11/143,207, 42 pages.
OA Dated Apr. 30, 2009 for U.S. Appl. No. 11/065,953, 22 pages.
OA dated Apr. 1, 2009 for U.S. Appl. No. 11/079,152, 68 pages.
OA Dated Mar. 19, 2009 for U.S. Appl. No. 11/067,164, 37 pages.
OA Dated Apr. 17, 2009 for U.S. Appl. No. 11/020,371, 38 pages.
Caro. Real-Time Networks in Industrial Automation. Dedicated System Magazines—2000—Q2. http://www.dedicated-systems.com, last accessed Apr. 6, 2009, 4 pages.
Pardi Junior, et al. A Supervisory Tool for Real-Time Industrial Automation Systems. In: Proceedings of the Sixth IEEE International Symposium on Object-Oriented Real-Time Distributed Computing (ISORC'03), IEEE 0-7695-1928-8/03. Downloaded from IEEE Xplore on Mar. 24, 2009, 8 pages.
Bicley, et al. The Integration of two control systems. Proceedings of the Particle Acelerator Conference, 1995 vol. 4, May 1-5 pp. 2220-2222 vol. 4 Digital Object Identifier 10.1109/PAC. 1995.505504. http://epaper.kek.jp/p95/ARTICLES/MPA/MPA12.PDF. Last accessed Feb. 26, 2009, 3 pages.
Bonastre, et al. A new generic architecture for the implementation of intelligent and distributed control systems. IEEE 2002 28th Annual Conference of the Industrial Electronics Society (IECON 02), vol. 3, Nov. 5-8, 2002 pp. 1790-1795 http://ieeexplore.ieee.org/stamp/stamp.jsp?arnumber=1185242&isnumber=26591. Last accessed Feb. 7, 2009, 6 pages.
Capella, et al. A brigade crane advanced control system implemented by means of a distributed expert system. In: Proceedigns Emerging Technologies and Factory Automation, 2003 (ETFA '03). IEEE Conference vol. 2, Sept. 16-19, 2003 pp. 347-353 vol. 2 Digital Object Identifier 10.1109/ETFA 2003-1248720.
Capella, et al. Distributed and mobile systems based on wireless networks: definition of a generic control architecture. International Conference on Industrial Technology, IEEE ICIT '04, vol. 2, Dec. 8-10, 2004, pp. 830-835 vol. 2 Digital Object Identifier 10.1109/ICIT.2004.1490182.
Decotignie, et al. Fulfilling Temporal Constraints in Fieldbus. International Conference on Industrial Electronics, Control and Instrumentation, 1993. Proceedings of the IECON'93, Nov. 15-19, 1993, pp. 519-524, vol. 1. DOI: 10.1109/IECON.1993.339022. http://ieeexplore.ieee.org/stamp/stamp.jsp?arnumber=339022&isnumber=7958. Last accessed Feb. 7, 2009, 6 pages.
Freeman. Achieving real-time Ethernet. Manufacturing Engineer, vol. 83, Issue 3, Jun.-Jul. 2004 pp. 14-15.
Furmanski, et al. Controller area network implementation in microwave systems. 14th International Conference on Microwaves, Radar and Wireless Communications, MIKON-2002, vol. 3, May 20-22, 2002 pp. 869-873 Digital Object Identifier 10.1109/MIKON. 2002. 1017975. http://ieeexplore.ieee.org/stamp/stamp.jsp?arnumber=1017975&isnumber=21906. Last accessed Fe. 7, 2009, 5 pages.
Garcia, et al. Reconfigurable Distributed Network Control System for Industrial Plant Automation. IEEE Transactions on Industrial Electronics, vol. 51, Issue 6, Dec. 2004 pp. 1168-1180. http://ieeexplore.ieee.org/stamp/stamp.jsp?arnumber=1360057&isnumber=29830. Last accessed Feb. 7, 2009, 13 pages.
Groza, et al. Cryptographic Authentication on the Communication from an 8051 Based Development Board over UDP. The Third International Conference on Internet Monitoring and Protection, ICIMP '08. Jun. 29-Jul. 5, 2008, pp. 92-97 Digital Object Identifier 10.1109/ICIMP.2008.27. http://ieeexplore.ieee.org/stamp/stamp.jsp?arnumber=4561332&isnumber=4561311. Last accessed Feb. 7, 2009, 6 pages.
Gustavson, et al. The Scalable Coherent Interface (SCI). Communications Magzine, IEEE vol. 34, Issue 8, Aug. 1996 pp. 52-63 Digital Object Identifier 10.1109/35.533919. http://ieeexplore.ieee.org/stamp/stamp.jsp?arnumber=533919&isnumber=11187. Last accessed Feb. 7, 2009, 12 pages.
Hong, et al. Analysis of real-time data transmission in the DLL of IEC/ISA fieldbus. IEEE International Symposium on Industrial Electronics, 1998. Proceedings ISIE'98, vol. 2, Jul. 7-10, 1998, pp. 694-699. Digital Object Identifier 10.1109/ISIE. 1998.711706. http://ieeexplore.ieee.org/stamp/stamp.jsp?arnumber=711706&isnumber=15303. Last accessed Feb. 7, 2009, 6 pages.
Mossin, et al. Networked Control Systems Distance Learning: State of Art, Tendencies and a New Fieldbus Remote Laboratory Proposal. IEEE International Symposium on Industrial Electronics, ISIE 2007. Jun. 4-7, 2007 pp. 1870-1875, Digital Object Identifier 10.1109/ISIE. 2007.4374892. http://ieeexplore.ieee.org/stamp/stamp.jsp?arnumber=4374892&isnumber=4374555. Last accessed Feb. 7, 2009, 6 pages.
Sanz, et al. PCT: Component-based Process Control Testbed Decision and Control. European Control Conference, CDC-ECC '05, Dec. 12-15, 2005 pp. 1577-1582. http://ieeexplore.ieee.org/stamp/stamp.jsp?arnumber=1582383&isnumber=33412. Last accessed Feb. 7, 2009, 6 pages.
Song, et al. PEPF monitoring system through an Analog Input to Ethernet Convereter. Particle Accelerator Conference, IEEE, Jun. 25-29, 2007 pp. 287-289 Digital Object Identifier 10.1109/PAC. 2007.4440.187. http://accelconf.web.cern.ch/AccelConf/p07/PAPERS/MOPAN059.PDF.
Wojzniz, et al. Neural network assisted control loop tuner. Proceedings of the IEEE International Conference on Control Applications, vol. 1, Aug. 22-27, 1999 pp. 427-431 vol. 1 Digital Object Identifier 10.1109/ CCA. 1999.806673.

Zwoll, et al. A Low Cost Local Area Network for Connecting Accelerator Equipment. IEEE Transactions on Nuclear Science, vol. 32, Issue 5, Part I, Oct. 1985 pp. 2077-2079. Digital Object Identifier 10.1109/ TNS.1985.4333820. http://ieeexplore.ieee.org/stamp/stamp.jsp?arnumber=4333820&isnumber=4333649. Last accessed Feb. 7, 2009, 3 pages.

OA Dated Aug. 27, 2008 for U.S. Appl. No. 11/067,164, 27 pages.

OA Dated Dec. 15, 2008 for U.S. Appl. No. 11/020,371, 56 pages.

OA Dated Jan. 5, 2009 for U.S. Appl. No. 11/143,207, 40 pages.

OA Dated Jan. 9, 2009 for U.S. Appl. No. 11/026,210, 16 pages.

OA Dated Nov. 18, 2008 for U.S. Appl. No. 11/065,953, 24 pages.

OA Dated Sep. 5, 2008, for U.S. Appl. No. 11/026,210, 40 pages.

European Search Report for European Application No. EP 05 02 7967, dated Apr. 6, 2009, 8 pages.

Wollshlaeger, et al. Web Integration of Factory Communication Systems Using an XML Framework. In: Proceedings of the IEEE International Symposium on Industrial Electronics, ISIE 2002. Jul. 8-11, 2002, NJ, USA, vol. 1, pp. 146-151. XP010598161.

Rodriguez-Martinez, et al. "Mocha: A Self-Extensible Database Middleware System for Distributed Data Sources." SIGMOD Record, ACM, USA, vol. 29, No. 2, Jun. 2000, pp. 213-224. XP002520426. http://citeseerx.ist.psu.edu/viewdoc/summary?doi=10.1.1.43.492. Last accessed Jun. 11, 2009, 12 pages.

OA dated Aug. 18, 2009 for U.S. Appl. No. 11/020,371, 58 pages.

OA dated Aug. 20, 2009 for U.S. Appl. No. 11/026,210, 32 pages.

OA dated Sep. 25, 2009 for U.S. Appl. No. 11/065,953, 18 pages.

OA dated Sep. 23, 2009 for U.S. Appl. No. 11/067,164, 18 pages.

\* cited by examiner

APPLICATION AND SERVICE MANAGEMENT FOR INDUSTRIAL CONTROL DEVICES

CROSS-REFERENCE TO RELATED APPLICATIONS

This application is a continuation of U.S. patent application Ser. No. 11/141,527, filed on May 31, 2005 and entitled APPLICATION AND SERVICE MANAGEMENT FOR INDUSTRIAL CONTROL DEVICES. This application is related to co-pending U.S. patent application Ser. No. 11/020,371 filed on Dec. 22, 2004 and entitled "INTEGRATION OF CONTROL AND BUSINESS APPLICATIONS USING INTEGRATION SERVERS," co-pending U.S. patent application Ser. No. 11/026,210 filed on Dec. 30, 2004 and entitled "DATABASE STORED PROCEDURE USED TO COLLECT CONTROL SYSTEM DATA," co-pending U.S. patent application Ser. No. 11/065,953 filed on Feb. 25, 2005 and entitled "TUNNELING FILE SYSTEM INTERFACE THROUGH NETLINX STACKS," co-pending U.S. patent application Ser. No. 11/067,164 filed on Feb. 25, 2005 and entitled "RELIABLE MESSAGING INSTRUCTIONS," and co-pending U.S. patent application Ser. No. 11/079,152 filed on Mar. 14, 2005 and entitled "EMBEDDED APPLICATION MANAGEMENT IN INDUSTRIAL CONTROL SYSTEMS." The entireties of these applications are incorporated herein by reference.

TECHNICAL FIELD

The subject invention relates to industrial control systems and, more particularly, to systems and methods that facilitate managing information within an industrial control environment.

BACKGROUND

Electronic commerce, or e-commerce, generally refers to business conducted over an electronic medium such as the Internet (e.g., through the World Wide Web, or Web). Electronic commerce transactions typically are facilitated through applications such as web services, electronic shopping carts, file transfer protocol (FTP), secure FTP, electronic data interchange (EDI), email, and Universal Description, Discovery, and Integration (UDDI), among others. Electronic commerce transactions commonly are differentiated based on the type of trading partners that are interacting. For example, commerce between a business and a consumer generally is referred to as business-to-consumer (B2C) commerce, whereas commerce between businesses generally is referred to as business-to-business (B2B) commerce. Integration servers can be utilized to couple business and/or consumer trading partners and coordinate communication therebetween. By way of example, two businesses that employ disparate operating systems and/or applications can utilize an integration server to interact across internal and external networked computer systems.

In many instances, e-commerce can leverage information obtained from control systems and/or affect control systems. For example, a consumer purchasing an automobile through a dealer's web site may desire to know the lead time associated with building an automobile with a customized set of options. The dealer may query its manufacturing plants to ascertain whether an automobile with those options has been built or is going to be built. The result along with additional information can facilitate determining when such automobile will arrive at the distributor. If the purchaser decides to place a custom order (e.g., where there is no plan to build a car with the desired combination of options), the custom specification can be provided to the manufacturing plant and utilized to automatically configure one or more control systems therein. For example, the customer may have specified the color green as the external color of the automobile. This data can be conveyed to a control system and utilized to automatically select a suitable paint gun (e.g., a paint gun associated with green paint) and/or green paint when the automobile is being assembled.

Control systems commonly employ one or more industrial controllers. A typical industrial controller is a special purpose processing device for controlling (e.g., via an automated and a semi-automated means) industrial processes, machines, manufacturing equipment, plants, and the like. Such controllers can execute a control program or routine in order to measure one or more process variables or inputs representative of a status of a controlled process and/or effectuate outputs associated with control of the process. For example, an output module can interface directly with a controlled process by providing an output from memory to an actuator such as a motor, drive, valve, solenoid, and the like. In distributed control systems, controller hardware configuration can be facilitated by separating the industrial controller into a number of control elements, each of which can perform a different function. Particular control modules needed for the control task can be connected together on a common backplane within a rack and/or through a network or other communications medium. Various control modules can also be spatially distributed along a common communication link in several locations. Data can be communicated with these remote modules over a common communication link, or network, wherein any or all modules on the network communicate via a common and/or an industrial communications protocol.

Industrial controllers, as well associated components, often do not have a general purpose execution environment for executing applications. In many instance, such capability, if present, could be leveraged by an industrial controller to execute one or more applications and/or services that would benefit the industrial controller. Some industrial controllers have associated execution environments; however, such environments typically are not accessible to other industrial controllers. Thus, there is need to provide techniques to share execution environments across industrial controllers.

SUMMARY

The following presents a simplified summary of the subject invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

Advancements in the capability, performance and networking of industrial control platforms creates an opportunity to extend their functional capability after manufacture by providing mechanisms which enable end users to integrate their own applications with the industrial control data. The subject invention provides a mechanism for these applications to migrate off standalone PCs and servers and execute on the industrial control hardware platform.

Accordingly, the subject invention relates to systems and methods that facilitate incorporating software applications and services with industrial control devices data and functional extensions to industrial automation execution environments. In addition, it includes systems and methods for accessing information, such as instructions (e.g., associated with files, executables, classes, objects . . . ), of a control system. This capability enables a control system entity the ability to leverage functionality of a second entity of the control system. Thus, the entity can utilize a service and/or execute an application residing within the second entity. The foregoing provides a novel mechanism wherein an entity without an execution environment can take advantage of such environment of another entity. Examples of such access include, but are not limited to, installing and uninstalling, start and stop, loading and/or unloading instructions, commencing, pausing and terminating instruction execution, passing parameters and variables to instructions, modifying, overriding instructions and removing instructions, etc.

In accordance with one aspect of the invention, a system that facilitates managing interaction with an industrial control system is provided. The system includes a control system that can encompass various control related components that can be utilized individually and/or in combination to control processes, machines, manufacturing equipment, plants, and the like. One or more components of the control system can be associated with one or more instructions or interfaces packaged as one or more reliable messages, binary files, ASCII files, source code, services, servlets, executables, classes, data structures, schema, objects, services, notifications, behaviors, PLC programs, alerts, timers, etc. A management component can be employed to interact with the control system. Such interaction can include, but is not limited to, access to the instruction(s), wherein the access can include, but is not limited to, register and deregister an application (service, servlet, software bundle), installing and uninstalling executable code, loading, unloading, spawning, invoking, executing, pausing, publishing, posting, retrieving, and/or terminating the instruction(s), passing parameters and/or variables to the instruction(s), and/or managing, modifying, overriding, moving, and/or removing the instruction(s). Besides executable code, there is support for data persistence, such as simple data types like configuration and data variables, and also include object data and relational data to be persisted in local and remote object database management systems (ODBMS), relational database management systems (RDBMS), and files. Optionally, a security component can be utilized to deny, provide and/or revoke access to the control system and/or the instruction(s), including determining and/or defining a scope (e.g., range, set of privileges . . . ) of access. Furthermore, any of the instruction(s) can be variously protected, for example, through encrypting, digitally signing, encoding, compressing, and password protecting techniques, among other things.

In accordance with another aspect of the invention, a system that facilitates communication between control system entities is provided. Suitable entities include, but are not limited to, a message broker, a control system, an industrial controller, a module, a Supervisory Control And Data Acquisition system (SCADA), a Manufacturing Execution System (MES), a Material Requirements Planning (MRP) an Enterprise Resource Planning (ERP) and/or a Master Control (MC) system, an application, an intelligent agent, autonomous I/O, a sensor network, a bridge, a scanner, an integration component, a database, a server, a client, a user, software configuration management application etc. The entities can utilize a management component to facilitate communications such as, for example, installing and uninstalling, register and deregister, pushing, conveying, storing, loading, posting, downloading information (e.g., instructions, parameters, variables, I/O, files, data points . . . ) between one another. One or more security components can be utilized to selectively enable access to the entities. Such access can be limited or unlimited, for example, as a function of identification (e.g., guest, administrator . . . ), attributes, logon, relationship (e.g., master, slave . . . ), group, function, password, etc.

In yet another aspect of the invention, a system that facilitates interaction with a plurality of controllers is provided. This includes a management component that can be utilized to concurrently and/or serially provide instructions, registry of applications and services available, software configuration management etc. to one or more industrial controllers. The management component can be leveraged by a user who can design, develop, and deploy custom instructions, reliable messages, routines, programs, applications, services, servlets etc. to one or more of the controllers via the management component. In addition, the management component or console can be utilized for installing and uninstalling, registering and deregistering, loading, unloading, spawning, invoking, executing, pausing, terminating, passing parameters and/or variables to, querying, searching, managing, modifying, overriding, removing, etc. such instructions, reliable messages, services, routines, servlets, programs, applications and the like. Further there is support for moving data between automation devices and persistent storage systems including object database management systems (ODBMS), relational database management systems (RDBMS), storage networks including (Network Attached Storage (NAS), Storage Area Networks (SAN), using iSCSI and other storage protocols, other devices, and files.

In still another aspect of the invention, methods are provided for conveying information to a control device, utilizing the information by the control device, and utilizing the information by another control component. These methods include interfacing control device information with managed applications, registering for events and notifications, data exchanging mechanisms such as inter-process communication (IPC), transparent inter process communication (TIPC), remote procedure invocation (RPC), sockets, named pipes, files, queues, messages, persistence and mapping data between local and remote files, object and relational database management systems, etc. Examples of entities that can convey and/or utilize such information include a message broker, a control system, an industrial controller, a module, a SCADA, a MES, an ERP and/or a MC system, an application, an intelligent agent, autonomous I/O, a sensor network, a bridge, a scanner, an integration component, a database, a server, a client, a user, etc. A security mechanism can be utilized to determine whether such access is allowed and/or define a scope of access. Suitable security mechanisms can include, but are not limited to, SSL, SASL, Kerberos, LDAP, NTLM, Active Directory, etc., and the scope of access can be based on identification, attributes, privileges, etc.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

The subject invention is now described with reference to the drawings. In the following description, for purposes of explanation, numerous specific details are set forth in order to provide a thorough understanding of the present invention. It may be evident, however, that the present invention may be practiced without these specific details. In other instances, well-known structures and devices may be shown in block diagram form in order to facilitate describing the present invention.

As utilized in this application, terms "component," "system," "controller," and variants thereof are intended to refer to a computer-related entities, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, system, apparatus, or article of manufacture using standard programming and/or engineering techniques to produce software, firmware, hardware, or any combination thereof to control a computer or automation device (e.g., controller) to implement the disclosed invention. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
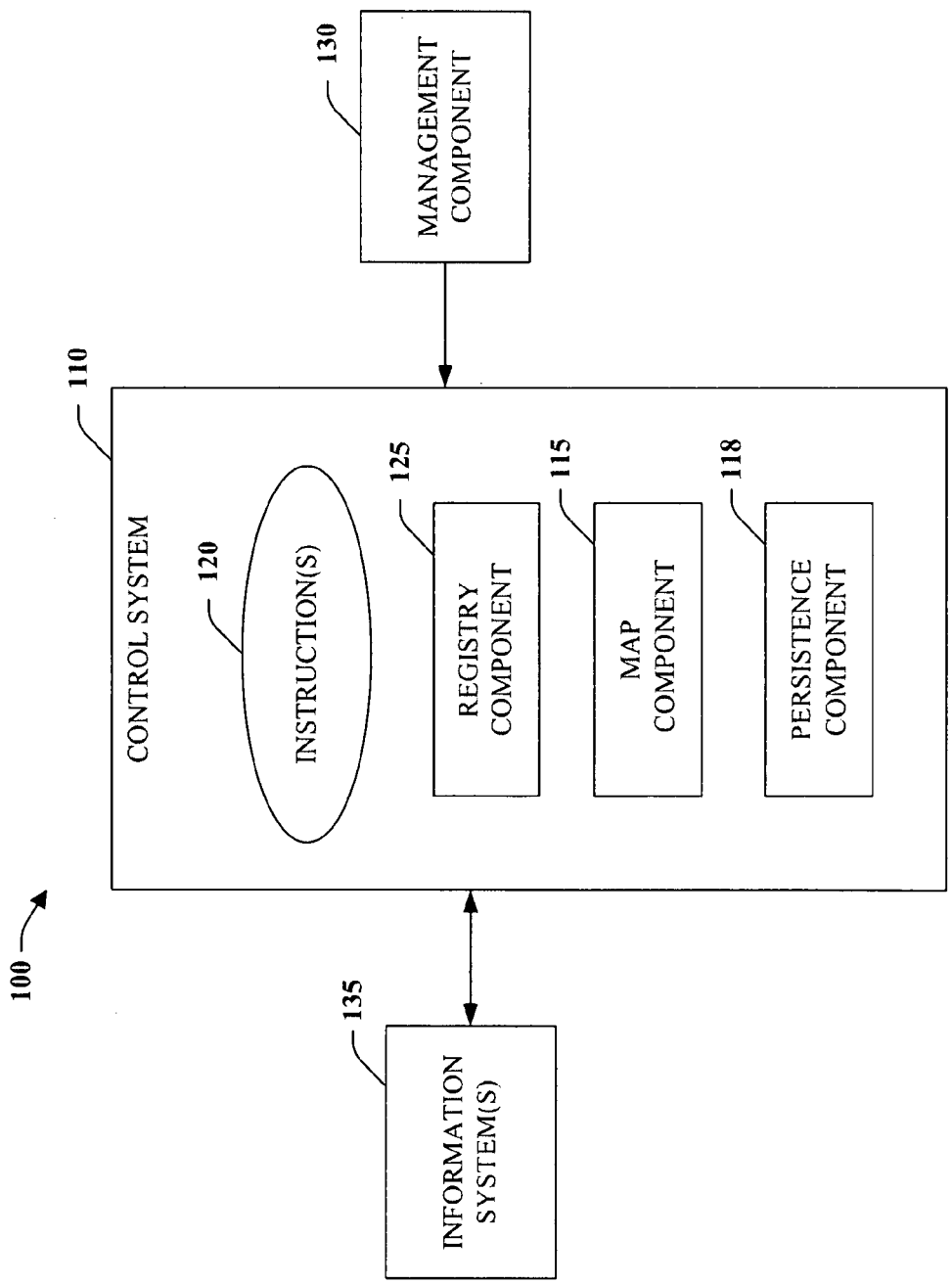
FIG. 1 illustrates an exemplary system that facilitates managing communication with an industrial control system.

FIG. 1 illustrates a system 100 that facilitates managing interaction with an industrial control system and devices and/or components comprising such a system. The system 100 includes a control system 110 that can encompass various control related components or automation devices such as, for example, one or more industrial controllers (e.g., hard, soft and combination thereof), modules (e.g., I/O, interface, . . . ), scanners, bridges, Human Machine Interfaces (HMIs), agents, autonomous I/O, etc. Such components can be utilized individually and/or in combination to control processes, machines, manufacturing equipment, plants, and the like. One or more components (not shown) or devices of the control system 110 can be associated with one or more instructions ("instruction(s)") 120. Such instructions can be related to, inter alia, automation logic, and can include or comprise one or more services, routines, applications, procedures, programs, bundles, classes and objects. The instruction(s) 120 can be programmed in essentially any programming language (e.g., industrial programming languages (including those specified by IEC 61131 standard(s) or enhancements extending the standards), C, C++, C#, Pascal, Assembly, Visual Basic, Java, Extensible Application Markup Language (XAML) . . . ). Furthermore, instructions can include those that interface with a virtual execution environment such as a Java Virtual Machine (JVM), .NET Framework (e.g., CLR-Common Language Runtime, Microsoft AVALON (XAML execution engine)), or operating system, network interface(s) and associated with one or more reliable messages, binary files, ASCII files, source code, executables, classes, data structures, schema, objects, services (e.g., diagnostic, firmware update, protocol conversion, custom-written . . . ), servlets, notifications, behaviors, alerts, timers, local and remote database related functionality such as table replication, transferring or processing SQL statements as a client or server, loading/unloading table data, etc. In addition, the instruction(s) 120 can reside within the one or more components associated with the control system 110. Moreover, the instruction(s) 120 can be stored in volatile and/or non-volatile storage (e.g., static, portable . . . ), including virtual storage, that is located locally and/or remotely from the control system 120.

Control system 110 can also include a registry component 125, with which applications may be registered and employed to facilitate discovery and management of applications, platform extensions, and services, among other things. For example, instructions 120 corresponding to PLC instructions may be used to launch a reliable messaging application provided to the industrial control platform for execution in its Java Virtual Machine resident thereon. The reliable messaging application may register for system events and pass them along to a message broker located within the industrial control system 100 or to an information technology (IT) system or server (not shown) outside system 100.

In addition, control system 110 can include a map component 115 that maps or facilitates mapping of information or data (e.g., control variables, tags . . . ) between local databases (e.g., object, relational . . . ) and remote information system(s) 135. Such information systems 135 can include but are not limited to MES (Manufacturing Execution System), MRP (Material Resource Planning), ERP (Enterprise Resource Planning) and the like. For example, local java object may persist their state via a map or mapping to either a relational database or an object database management system, or device supporting persistence (iSCSI, NAS, SAN etc). Furthermore, there may be a mapping performed between information received or requested from a remote database system (object or relational) and a local data store (e.g., registry, file, addressable memory, database . . . ).

Still further, control system 110 can include a persistence component 118, with which a control device may store control system information, including files, addressable memory, relational and object databases (not shown). Further, persistence component 118 may be accessed by remote information system(s) 135, where configurations, process values, quality information, build parameters, line or area workflow is exchanged, read, written, programmed and the like.

It should be appreciated that components of the control system 110 can be single components provided to the entire control system 110 (e.g., shared) or alternatively isolated within one or more control system devices that comprise the control system 110.

A management component 130 can be employed to interact with the control system 110. Such interaction can include, but is not limited to, access to the instruction(s) 120, wherein the access can include, but is not limited to, loading, unloading, spawning, invoking, executing, pausing, publishing, retrieving, posting, and/or terminating the instruction(s) 120, passing parameters and/or variables to the instruction(s) 120, reading and/or writing data to persistent storage component 118, and/or managing, modifying, overriding, moving, and/or removing the instruction(s) 120. Furthermore, the management component 130 can interact with registry 125, and send events, messages, notifications, install and uninstall, register and deregister applications, services, servlets, applets, and executable modules. It is to be appreciated that various techniques can be utilized to facilitate interaction between the control system 110 and the management component 130. For example, various adapters, connectors, channels protocols, etc. can be utilized by either or both the control system 110 and the management component 130. Further, management component 130 may be located within industrial control devices and interface with the control applications and data through inter-process communication mechanisms such as sockets, web services, remote procedure invocations, servlet containers, Java application and Java Bean containers, component object model (COM) and Distributed COM interfaces, named pipes, file descriptors, memory mapped interfaces, messages, reliable messages, event handlers, queues. In addition, the communication can be through wire and/or wireless communication techniques. Examples of suitable techniques include Ethernet, serial port, parallel port, coaxial cable, Infrared (IR), BLUETOOTH®, Universal Serial Bus (USB), Firewire, WiFi, WiMax, 802.11 A,B,G, 802.15.4, Universal Plug and Play (UPnP), Ultra WideBand (UWB) and the like, and examples of suitable communications mediums include category 1-5 wire (e.g., CAT5 UTP 8-wire cable), coaxial cable, USB, RS-232, RS-485 and so forth.

Figure 2:
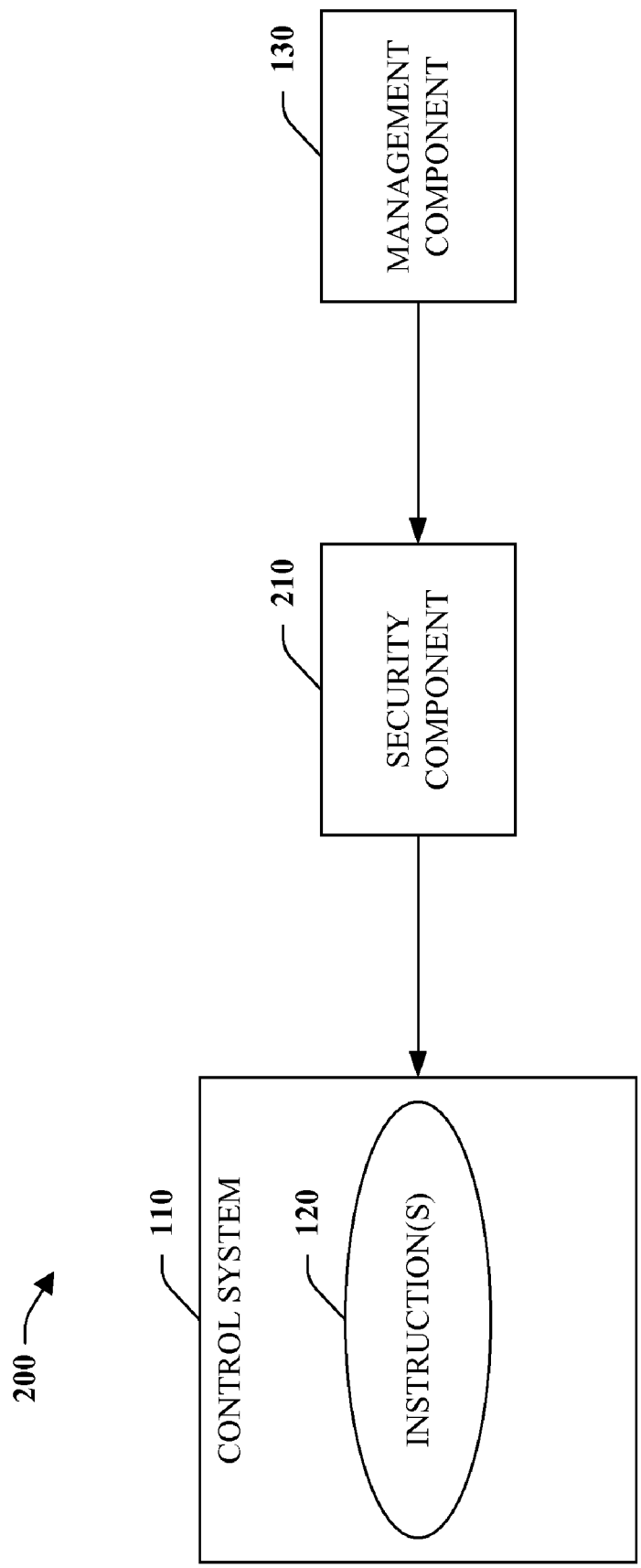
FIG. 2 illustrates an exemplary system that utilizes a mechanism that provides for secure interaction with an industrial control system.

FIG. 2 illustrates a system 200 with a component that facilitates providing secure access to the control system 110. The system 200 includes the control system 110, the instruction(s) 120, data 121 (including persistent and non-persistent) and the management component 130, as described in connection with system 100 of FIG. 1. For purposes of brevity and not limitation, the additional components of system 110 as described in system 100 are not re-presented and described. However, it should be appreciated that such component(s) can be included with control system 110 of system 200. In addition, system 200 includes a security component 210. As depicted, the security component 210 is a separate component that can reside between the control system 110 and the management component 130. However, the invention is not so limited. It is to be appreciated that the security component 210 can reside within the control system 110 and/or the management component 130.

The security component 210 provides a mechanism to deny, provide and/or revoke access to the control system 110, components thereof, and/or the instruction(s) 120 and/or the data 121, including determining and/or defining a scope (e.g., range, set of privileges . . . ) of access. It is to be understood that the security component 210 can be utilized to authenticate and/or authorize invocation or action of the management component 130. Further, component 210 may leverage the operating system provided security mechanisms such as Unix Group ID, whereby a user or client application may or may not belong to a group with access to specific files, data, applications, or ability to invoke, install, deregister a service, etc. Thus, an identity and/or other indicia associated with the invoker can be determined, wherein suitable access privileges (e.g., read, write, execute . . . ) can be provided. Examples of security mechanisms that can be employed in accordance with the subject invention include, but are not limited to, IPsec, SSL, SASL, Kerberos, LDAP, NTLM, Active Directory and/or other authentication mechanisms. Furthermore, any of the instruction(s) 120 conveyed to, stored in, obtained from, etc. the control system 110 can be variously protected and/or formatted. For example, the instruction(s) 120 can be encrypted, digitally signed, encoded, compressed, password protected, etc. Similarly security component 210 an interact with the data component 121 to read and write information that can be variously protected and or formatted where the data can be encrypted, digitally signed, encoded, compressed, password protected, etc.

Figure 3A:
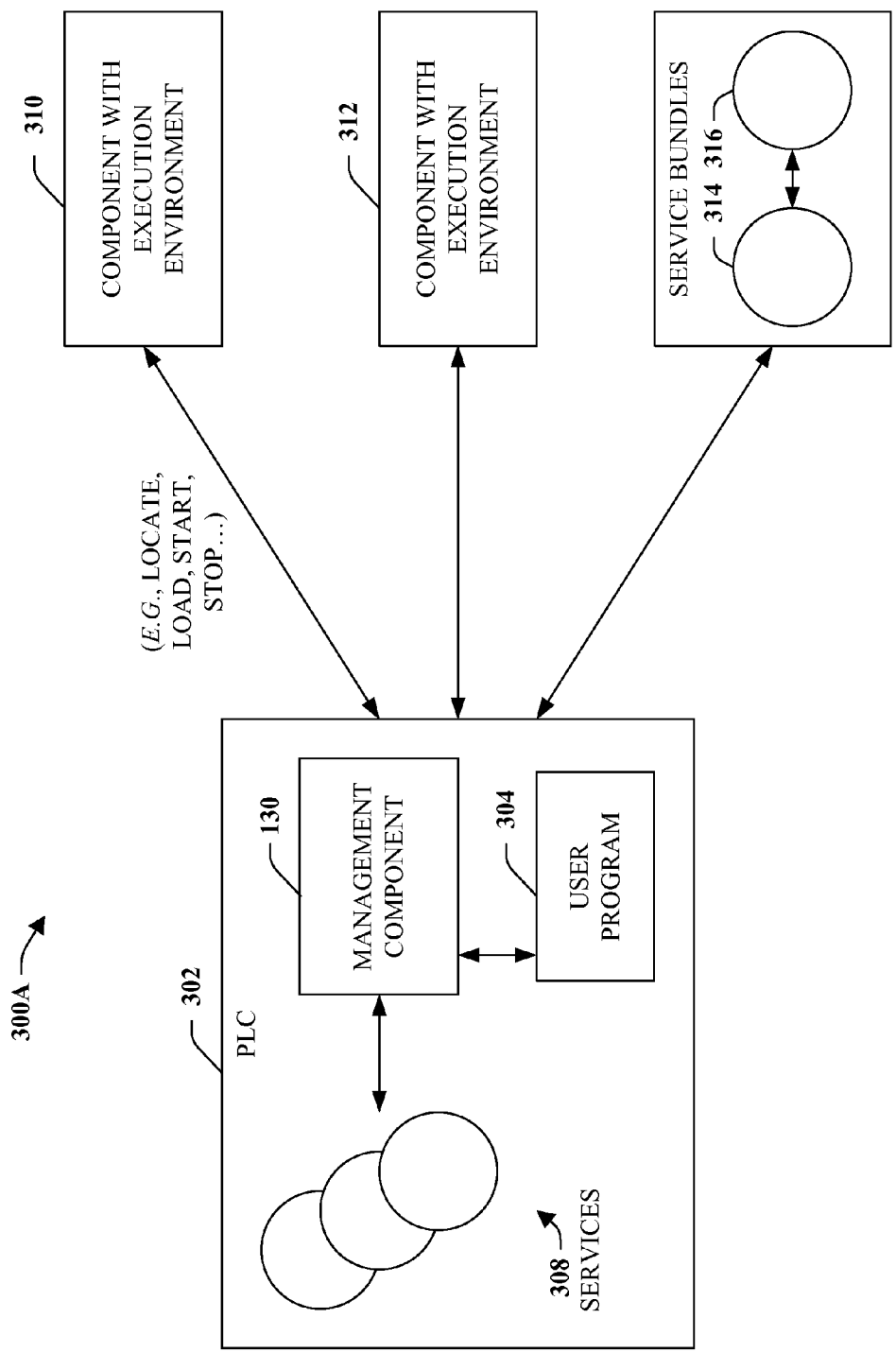
FIG. 3A illustrates an exemplary system with a service management component that loads and/or executes a locally stored service within a remote component.
Figure 3B:
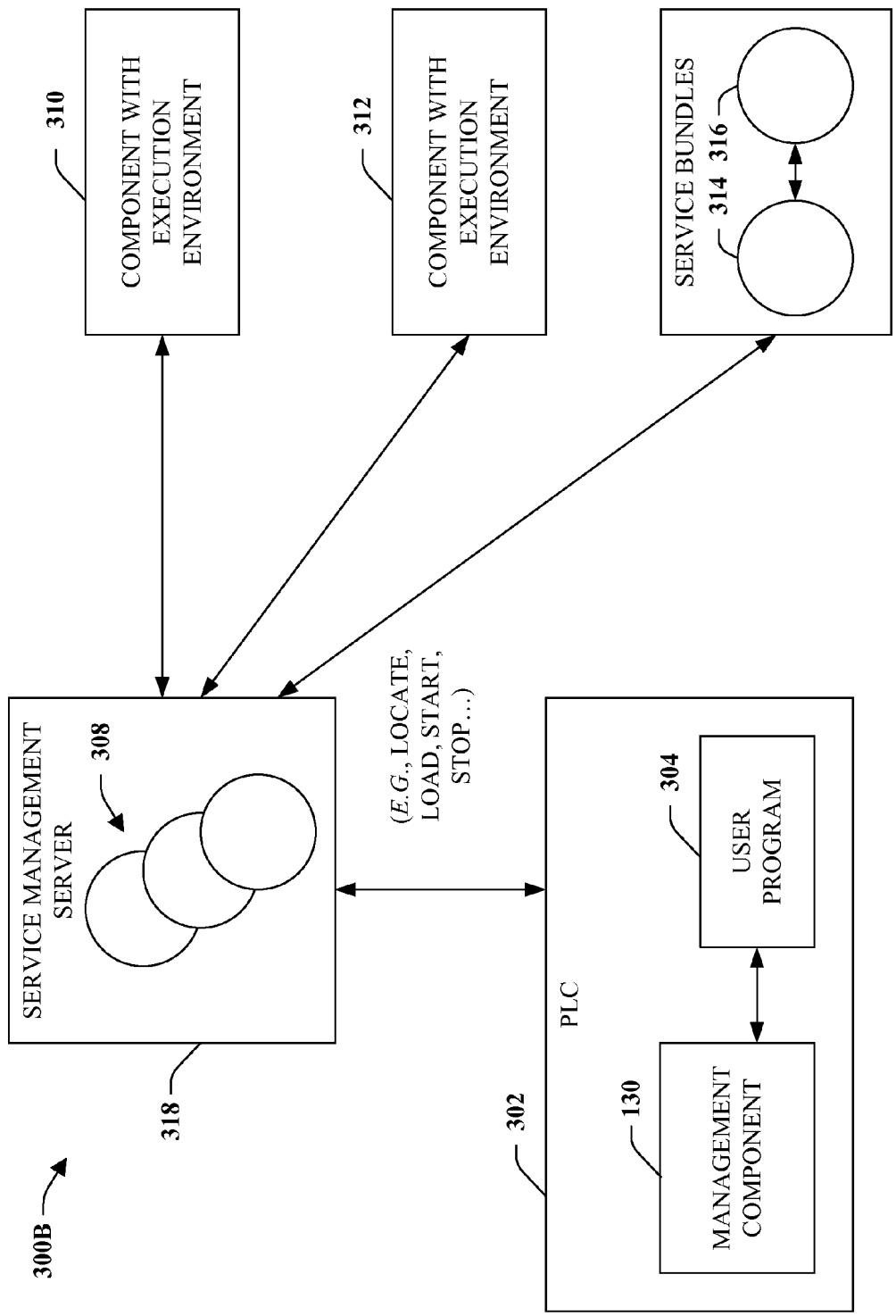
FIG. 3B illustrates an exemplary system that with a service management component that loads and/or executes a remotely stored service within a remote component.
Figure 3C:
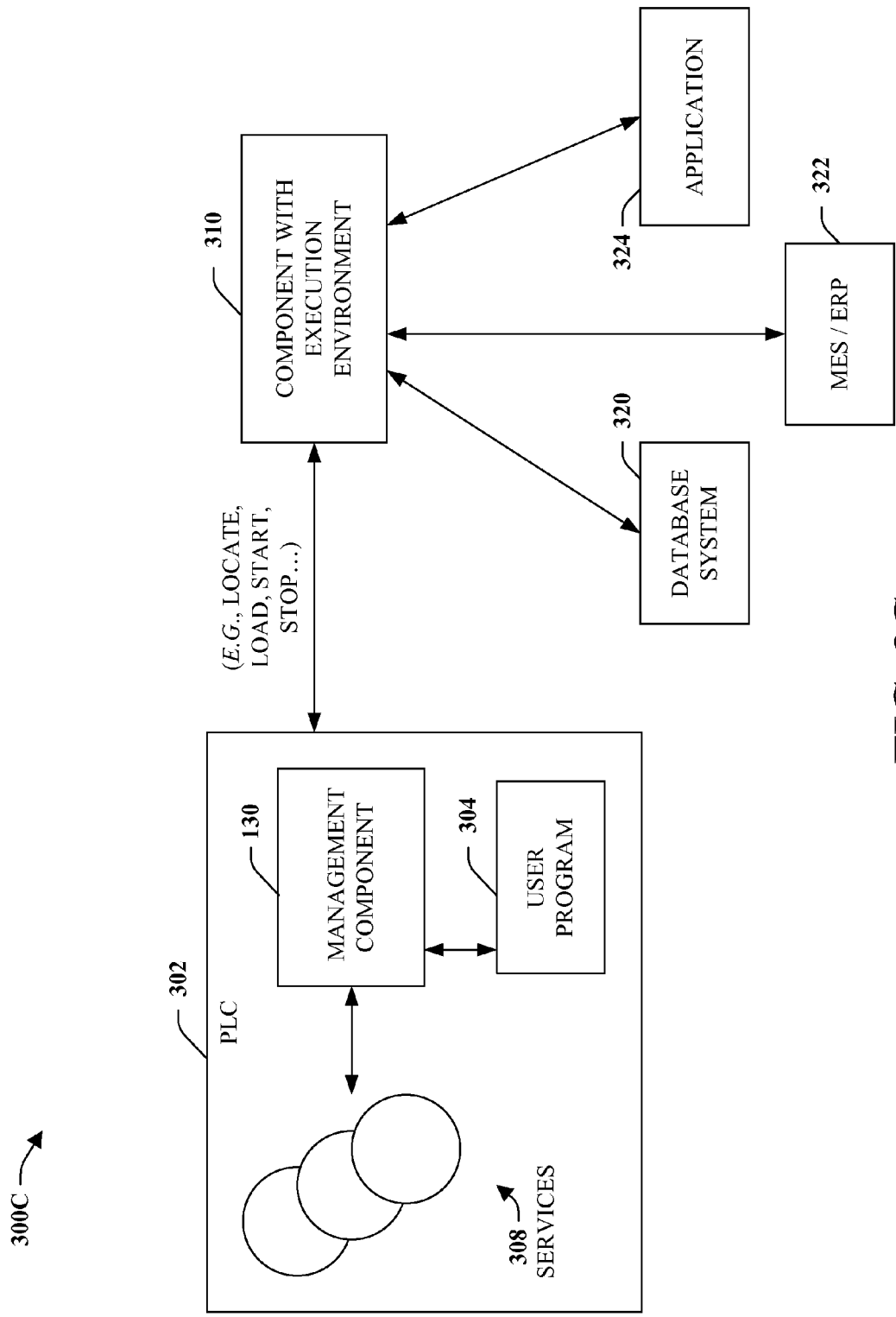
FIG. 3C illustrates an exemplary system that facilitates interacting with application and/or system components.

FIGS. 3A, 3B and 3C illustrate examples of various PLC based systems 300A, 300B, and 300C that can be employed in accordance with the subject invention. It is to be understood that these examples are for explanatory purposes and are not meant to limit the scope of the invention in any way. As per FIG. 3A, system 300A illustrates a PLC 302 with a user program 304 that accesses and/or interacts with service management component 130 (management component as otherwise described herein) to cause at least one of the services 308 to be loaded to a remote component 310 and/or a remote component 312, and executed therein or thereby. Component 310 and/or 312 may contain or include a PLC 302 or control related component or device (I/O module, Ethernet module, HMI . . . ) as described in FIG. 1 with respect to system 100. It is to be appreciated that such service 308 can be utilized, among other things, to update firmware, connect to a database, and perform a portion of the control function. For example, device 302 may upload and configure an alarm service 308 that will locally monitor data points while executing on device 310. The device 302 no longer must poll data at 310 to detect the alarm condition because the alarm service is integrated with the application, data, and execution environment of device 310. If and when an alarm event occurs, device 310 can use the application or service 308 to notify several system devices with a reliable messaging or other communication means.

The service management component 130 is operable to, among other things, remotely locate and/or find a service, install and uninstall services, register and deregister services, load a service, start a service, stop a service, pass a parameter to a service, receive parameters from a service, as well as read and/or write to data and persistent storage on component 302, as well as 310, and 312. In another aspect of the invention, the PLC 302 can load a plurality of services 314 and 316 to the remote component 310 and 312, wherein the remotely loaded services 314 and 316 can interact with each other. It is to be appreciated that the service bundles 308 and/or 314 and 316 can be self-contained and deliverable for execution, unlike conventional systems that simply invoke a service remotely. Moreover, the service bundles 308 and/or 314 and 316 do not need to be binary executables or Java classes. For example, in various aspects of the invention, pieces of a PLC program (e.g., ladder, ST, function block . . . ), and security enabling features such as tokens, keys or digital certificates, can be delivered.

FIG. 3B illustrates exemplary system 300B in which the service bundles 308 reside outside of the PLC 302 rather then within as in system 300A. With respect to system 300B, the service bundles 308 are remotely located within a service management server 318, and the service management component 130 can locate and/or deliver the bundles 308 to a local or third party device or component. Further, the service management server component 318 may also contain a management component 130 (not shown) that is used to deploy the service bundles to component 302, 310, and 312, as well as interact with the management component 130 contained by component 302, etc. From the perspective of a user program 304, the service management component 306 can be presented as atomic instructions in industrial programming languages, or by leveraging industrial programming instructions that support inter-process communication (standard I/O interfaces, read, write, named pipes, sockets, file descriptors, queues, etc).

FIG. 3C provides an additional or alternative system 300C. Similar to system 300A the services 308 are located within the PLC 302, however they could also be external as depicted in system 300B. System 300C illustrates the remote component 310 interacting with other application and/or system components such as a database system 320, a MES/ERP system 322, and an application 324. For example, a service bundle of services could be downloaded to component 310 to enable and/or facilitate communication or interaction with database system 320, MES/ERP system 322 and application 324.

It should be appreciated that the systems provided by FIGS. 3A-3C are provided to illustrate a subset of exemplary scenarios for purposes of clarity and understanding. All possible configurations or scenarios have not been depicted for purposes of brevity and not limitation. For example in system 300C, services 308, which reside in PLC 302, may have been delivered by the component 320, 322, and/or 324. The services 308 may be intended to run locally on device 302 or be delivered by PLC 302, and more specifically management component 130, to another device in the system. Furthermore, the components of FIGS. 3A-3C can switch places and be run by other embedded devices (e.g., Ethernet modules, interface . . . ) or on servers.

Figure 4:
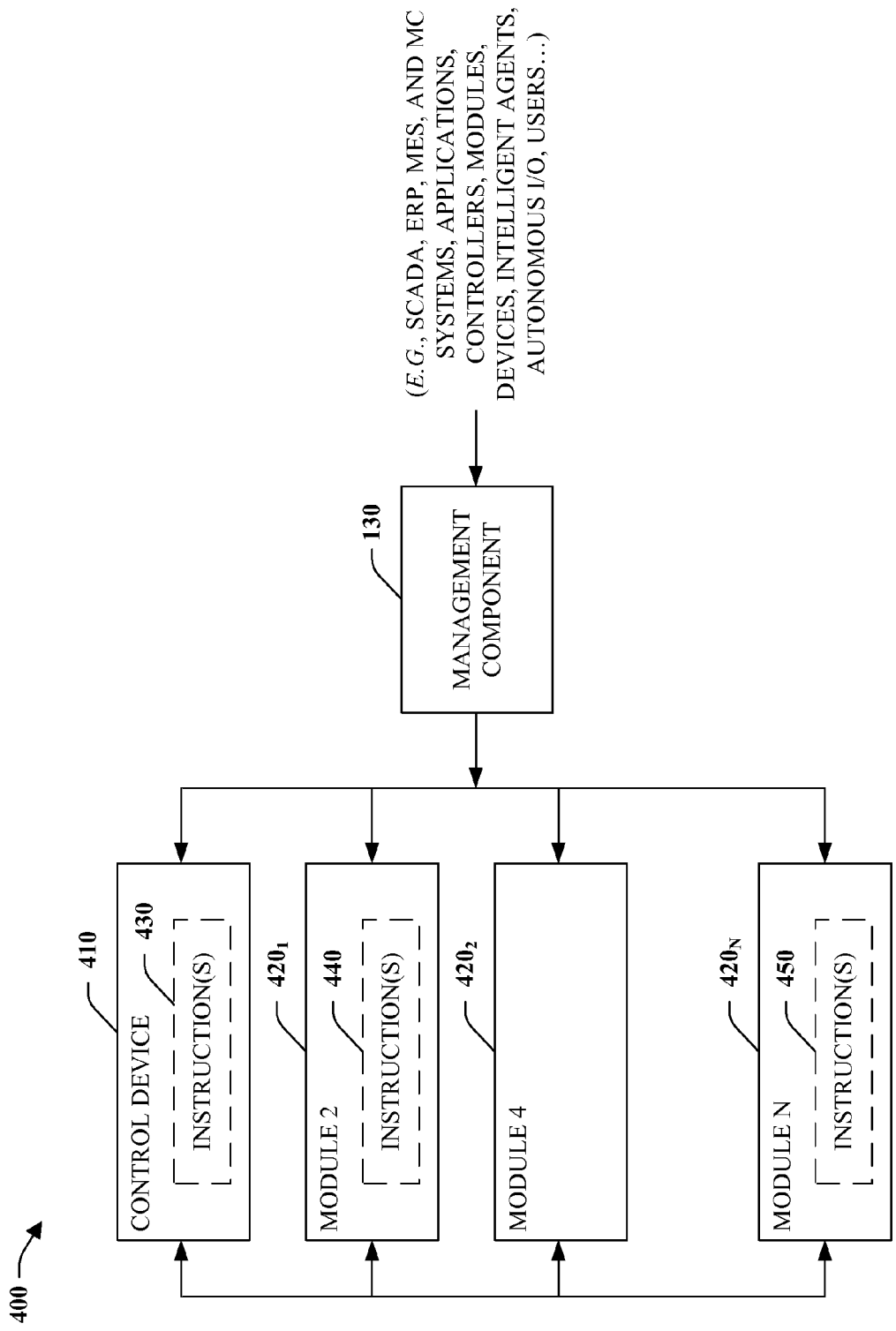
FIG. 4 illustrates an exemplary system that facilitates accessing instructions associated with industrial control devices.

FIG. 4 illustrates a system 400 that facilitates accessing instructions or executable code and/or data associated with industrial control devices. The system 400 includes a control device 410. As depicted, the control device 410 is associated with at least a module $420_1$, a module $420_2$, and a module $420_N$, wherein N is an integer greater than zero. Collectively, the modules $420_1$, $420_2$, and $420_N$, are referred to herein as modules 420. It is to be appreciated that the modules 420 can be any industrial control module, for example, an I/O module, a memory module, an Ethernet module, human machine interface (HMI) and so forth. In addition, one or more of the modules 420 can store and/or invoke instructions associated with the control device 410. In this example, which does not limit the subject invention, the control device 410 is associated with one or more instructions ("instruction(s)") 430, the module $420_1$ is associated with one or more instructions ("instruction(s)") 440, and the module $420_N$ is associated with one or more instructions ("instruction(s)") 450. No instructions are stored with the module $420_2$. As noted previously, such instructions can be programmed in virtually any programming language and associated with one or more reliable messages, binary files, ASCII files, source code, executables, classes, data structures, schema, objects, etc. It should be appreciated that instructions 450 may include data and configuration in addition to pure functional components, such as just executable code.

The control device 410 can be hardware and/or software based and can execute control programs, routines, instruction sets, etc. that obtain and/or analyze inputs and/or generate outputs that affect a controlled entity (e.g., processes, machines, manufacturing equipment, plants . . . ). It is to be appreciated that such control programs, routines, etc. can be programmed in essentially any programming language. Examples of suitable languages include structured text (ST), sequential function chart (SFC), functional block diagram (FBD), instruction list (IL), and ladder diagram (LD), C, C++, C#, Graphical Motion Language (GML), Java, Flow-Charts, etc., and/or any combination thereof. In addition, the control device 410 can communicate with any and/or all of the modules 420 through a backplane, network, middleware, card, port, channel, wire, bridge, etc. As note above, the modules can be utilized individually and/or in combination with each other and with other components to facilitate controlling one or more entities including but not limited to machines.

The system 400 further includes a management component 130. The management component 460 can be employed to communicate with the control device 410 and/or any of the modules 420, for example, to access any of the instruction(s) 430-450. Such access can include, but is not limited to, install and uninstall, register and deregister services, bind and unbind with a software component interface, loading, unloading, spawning, invoking, executing, pausing and/or terminating the instruction(s) 430-450, passing parameters and/or variables to the instruction(s) 430-450, and/or managing, modifying, overriding and/or removing the instruction(s) 430-450, and/or reading and/or writing data and/or configuration. As noted previously, various mechanisms can be utilized to facilitate communicating between the interface component 460 and components of a control system such as the control device 410, including wire and/or wireless adapters, connectors, channels protocols, etc. that can reside in connection with the control device 410 and/or the management component 460. Further, the management component 130 can be included in one or more of the modules 410 or $420_1$-$420_N$.

It is to be appreciated that various entities can utilize the management component 130 to communicate with the control device 410 and/or the modules 420. Suitable entities include, but are not limited to, message brokers, integration servers, integration components (as described herein), control systems, industrial controllers, modules, SCADA, MES, ERP, and/or MC systems, applications, intelligent agents, autonomous I/O, sensor networks, bridges, scanners, databases, servers, clients, users, software revision management applications, software deployment applications etc. Such entities can utilize the management component 130 to install and uninstall, bind and unbind software components, register and deregister services, load, unload, spawn, invoke, execute, pause, terminate, pass parameters and/or variables to, and/or manage, modify, override and/or remove the instruction(s) 430-450, read/write data and/or configuration, for example. Optionally, the system 400 can employ a security mechanism (e.g., the security component 210) to facilitate the above noted entities with communicating with the control device 410 and/or modules 420. It is to be appreciated that such security mechanism can be utilized at least to authenticate and/or authorize the entity to load, unload, spawn, invoke, execute, pause, terminate, pass parameters and/or variables to, and/or manage, modify, override and/or remove the instruction(s) 430-450 which can include data and/or configuration. In addition, techniques for encrypting, digitally signing, encoding, compressing, password protecting, etc. the instruction(s) 430-450 that may include data and/or configuration can be employed in accordance with aspects of the invention.

Figure 5:
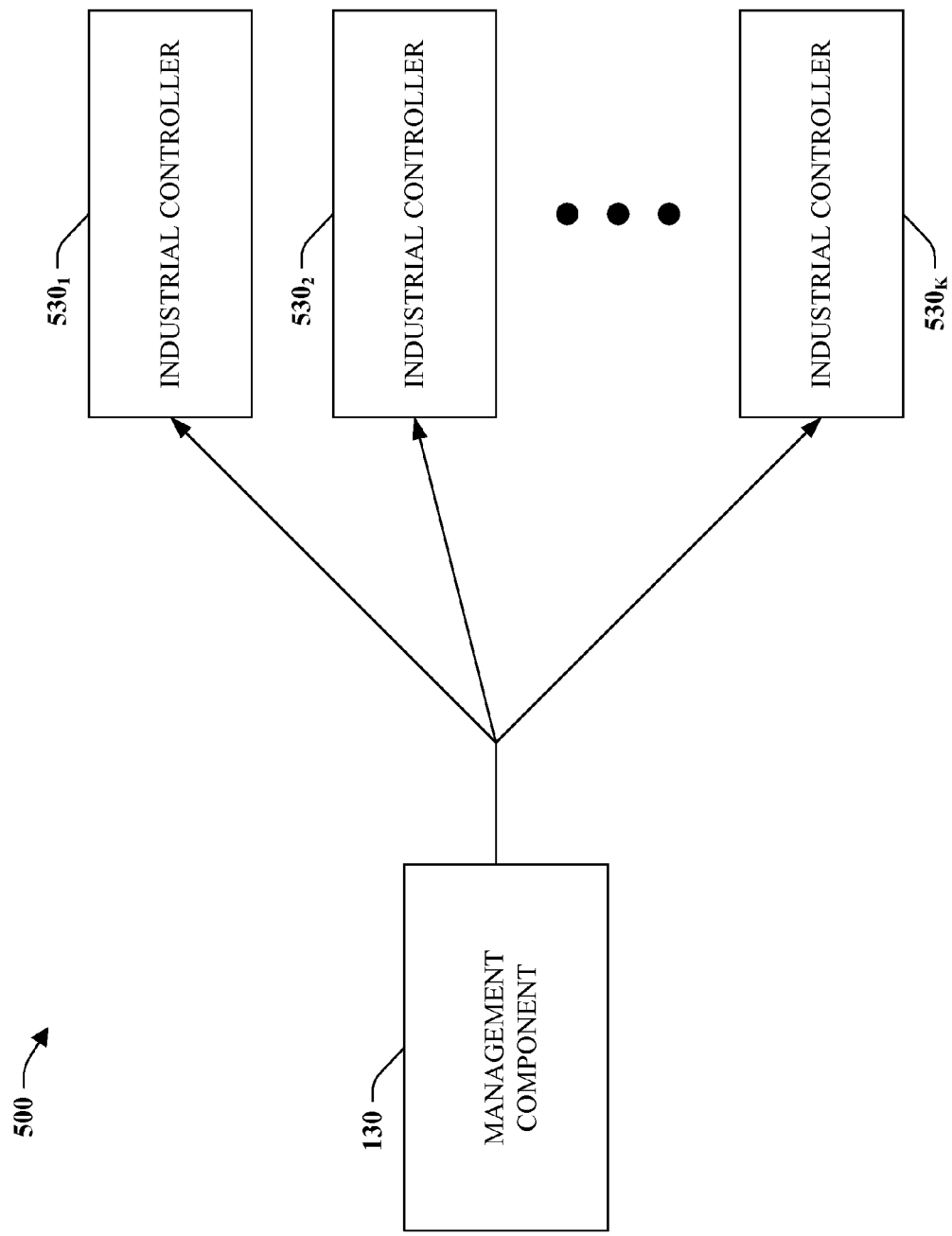
FIG. 5 illustrates an exemplary system that facilitates interaction with a plurality of controllers.

FIG. 5 illustrates a system 500 that facilitates interaction with a plurality of controllers. The system 500 includes a management component 130. The management component 130 (e.g., an application management console) can be utilized to concurrently and/or serially provide instructions, etc. to one or more of an industrial controller $530_1$, an industrial controller $530_1$, and an industrial controller $530_K$, wherein K is an integer greater than zero. Collectively, the industrial controllers can be referred to herein as controllers 530. Thus, a user can design, develop, and deploy custom instructions, reliable messages, routines, programs, applications, etc. to one or more of the controllers 530 via the management component 130. In addition, the management component 510 can be utilized for discovery of applications, software bundles, components and services, installing and uninstalling, binding and unbinding software components, registering and deregistering services, loading, unloading, spawning, invoking, executing, pausing, terminating, passing parameters and/or variables to, querying, searching, managing, modifying, overriding, removing, etc. such instructions, reliable messages, web services, routines, programs, applications, data, relational and object database management systems etc. Furthermore, it should be noted that management component 130 could be a controller component such that it forms part of or resides within a programmable logic controller.

Figure 6A:
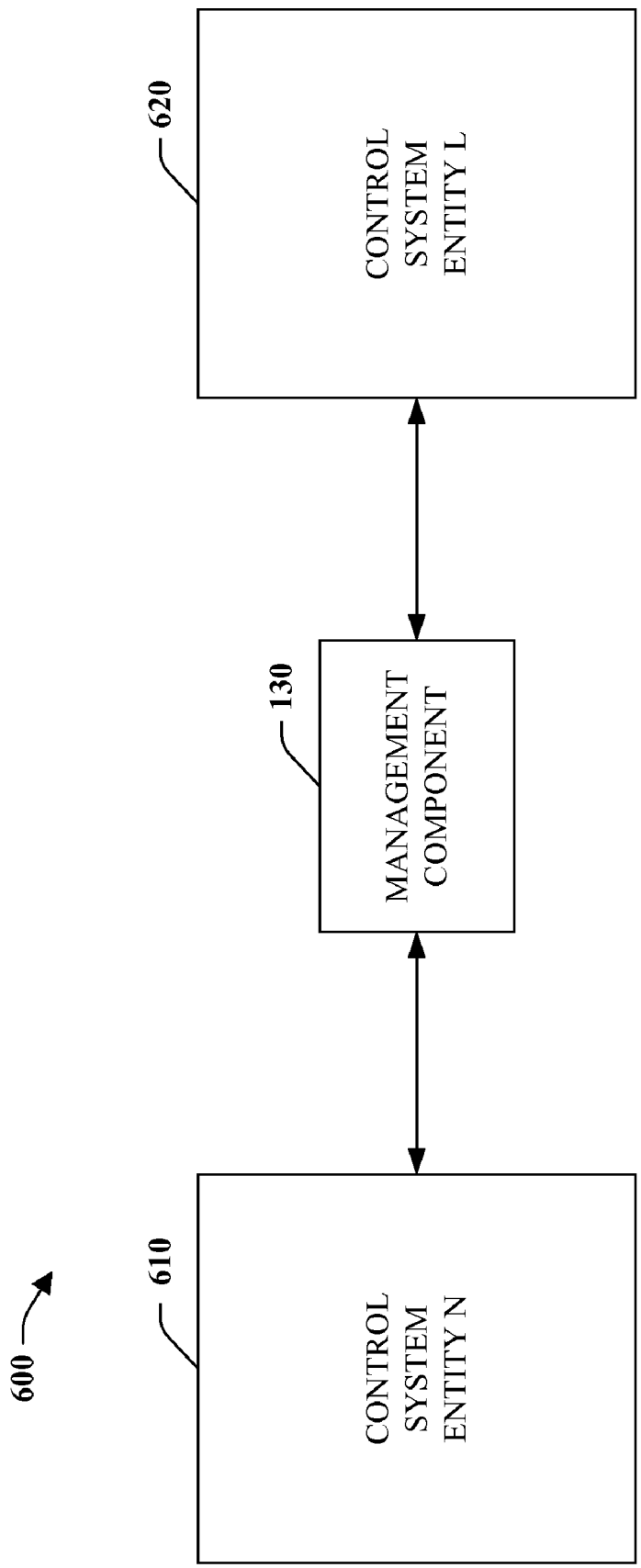
FIG. 6A illustrates an exemplary system that facilitates communication between control system entities.

FIG. 6A illustrates a system 600 that facilitates communication between control system entities. The system 600 includes a control system entity N 610 ("entity 610") and a control system entity L 620 ("entity 620"). The entities 610 and 620 can be any industrial control system component. For sake of brevity and explanatory purposes, the following discusses the invention in terms of entities such as industrial controllers. However, it is to be understood that the subject invention is not limited, and as noted above contemplates all control system components or devices. In addition, it is to be appreciated that in this example the entity 620 can be a headless device, without an input mechanism (e.g., keyboard, mouse . . . ) and/or an output mechanism (e.g., display . . . ), or include one or both of an input mechanism and/or output mechanism.

The entity 610 can utilize a management component 130 to communicate with the entity 620. Such communication can include, but is not limited to, installing and uninstalling, registering and deregistering services, binding and unbinding software components, configure applications, pushing, conveying, storing, loading, posting, downloading information (e.g., instructions, parameters, variables, I/O, files, data points, data to/from relational and/or object database management system . . . ) to the entity 620. This information along with other information residing within and/or outside the entity 620 can be utilized by the entity 610, the entity 620 and/or other entities (e.g., controllers, modules, services . . . ). For example, the entity 620 can invoke, execute, pause, terminate, modify, remove, convey, delete, and overwrite, etc. such information. In another example, the entity 610 can employ the management component 130 to query, search, invoke, pause, terminate, modify, execute, remove, delete, overwrite, etc. the information within the entity 620.

Figure 6B:
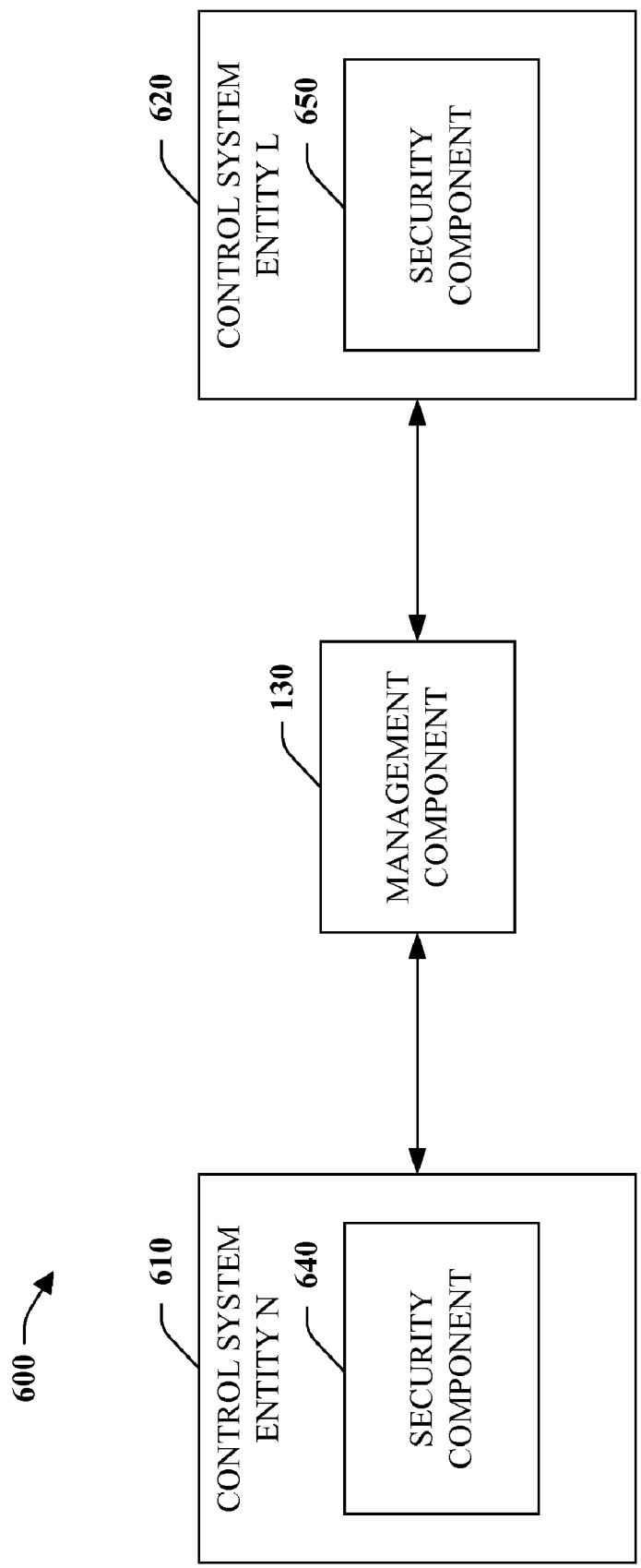
FIG. 6B illustrates an exemplary system that facilitates secure interaction between control system entities.

FIG. 6B illustrates the system 600 that facilitates secure interaction between control system entities. The system 600 includes the entities 610 and 620 and the management component 130 that can be utilized to facilitate interaction between the entities 610 and 620. The system 600 further includes a security component 640 and a security component 650. As depicted, the security component 640 is associated with the entity 610, and the security component 650 is associated with the entity 620. It is to be appreciated that additionally and/or alternatively a single security component can be associated with both the entities 610 and 620 or a plurality of security components can be associated with either or both the entities 610 and 620. In addition, the security components 640 and 650 can reside within the entities 610 and 620, as illustrated, leveraging operating system security related features such as the Java sandbox and Unix Group or Windows user privileges, Java web and/or J2EE java bean container and/or external to the entities 610 and 620, including distributed over a network.

In one instance, the security components 640 and 650 can be utilized selectively to enable access to the entities 610 and/or 620, respectively. For example, the entity 620 can employ the security component 650 to allow other entities (e.g., the entity 610) and/or the management component 130 to access one or more portions, regions, etc. of the entity 620, for instance, to access instructions or data stored therein. Such access can be limited or unlimited, for example, as a function of identification (e.g., guest, administrator . . . ), attributes, logon, relationship (e.g., master, slave . . . ), group, function, password, etc. Likewise, the entity 610 can employ the security component 640 to define access thereto. In addition, the security component 640 and 650 can be utilized to define the operations the entities 610 and 620 can perform in relation to other entities. For example, although the security component 650 of the entity 620 may provide full access to the entity 610, the entity 610 may only be able to a subset of such access by the security component 640. Thus, the access provided to any entity can be a function of the security of that entity and/or the accessed entity. As noted previously, such access can include the ability to load, unload, spawn, invoke, execute, pause, terminate, pass parameters and/or variables to, and/or manage, modify, override and/or remove information such as instruction, files, programs, executables, classes, objects, services, reliable messages, data, information to/from relational and object database management systems, etc.

Figure 7A:
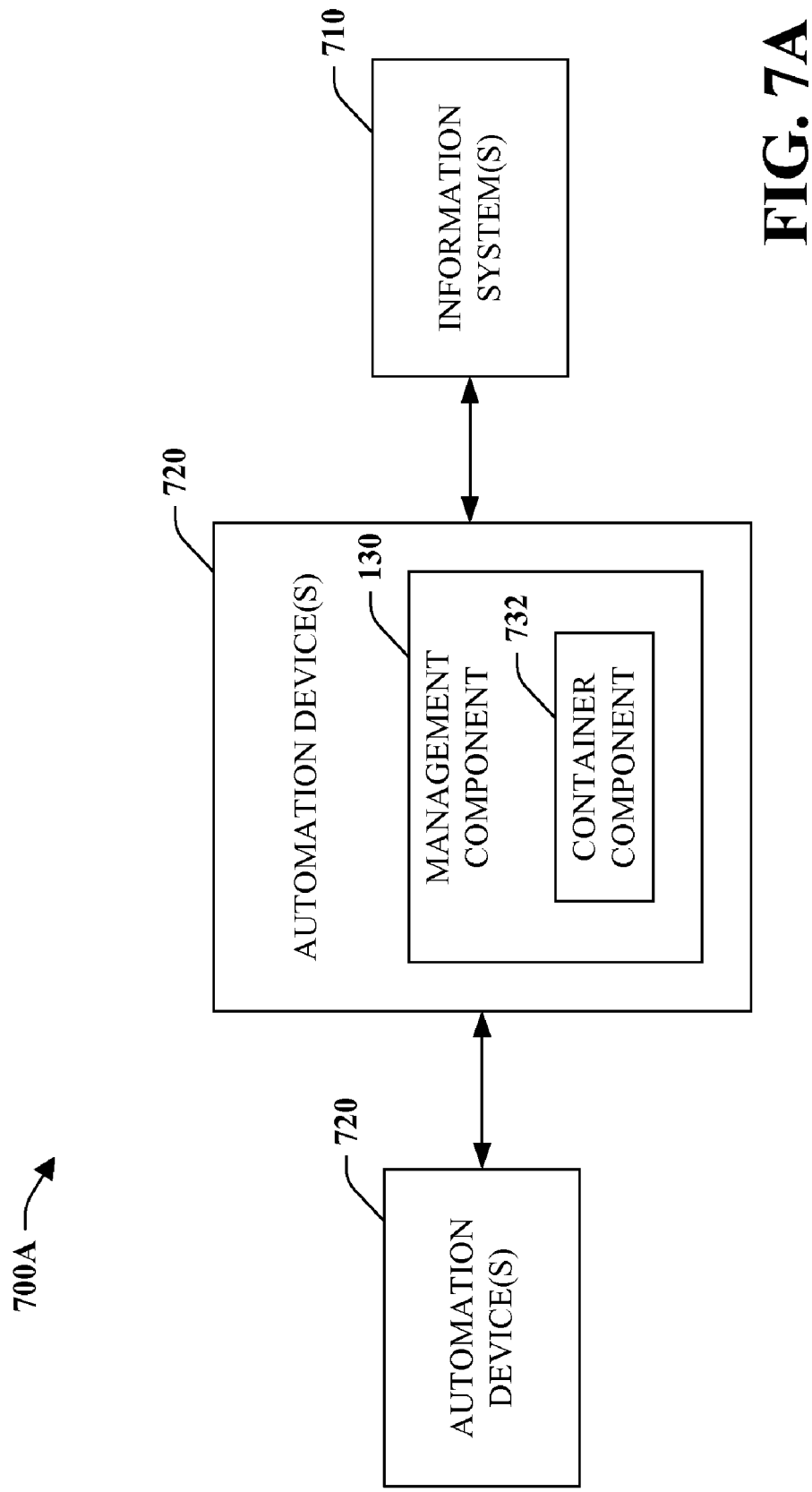
FIG. 7A depicts an exemplary automation device interaction system.

FIG. 7A depicts an automation device interaction system 700A in accordance with an aspect of the invention. System 700A includes information system 710 and automation device(s) 720. Information system 710 can correspond to an enterprise system and/or server and include or otherwise interact with an enterprise database (not shown). System 710 can also include, inter alia, applications, services, and data. For example, information system 710 can include an MER/MRP/ERP system, or object or relational database management system. Information system 710 is communicatively coupled to at least one automation device 720. By way of example and not limitation, automation device 720 can be a programmable logic controller (PLC), an Ethernet module, or an interface. The automation device 720 can include a management component 720. Management component 130 can facilitate communication between a first automation device such as a PLC and one or more other automation devices 720. Among other things, management component 130 can aid loading, unloading, spawning, invoking, executing, pausing, publishing, retrieving, posting, and/or terminating the instruction(s), application routines, services, data and the like. Furthermore, management component 130 can facilitate passing parameters and/or variables to the instruction(s) and the like; reading and/or writing control system data objects persistence values and the like, and/or managing, modifying, overriding, moving, and/or removing the instruction(s), applications, services, routines and so forth. Management component 130 can include a container component 732. Container component 732 can house automation logic and/or data such as, but not limited to, ladder logic. The automation logic can be received, for example, from information system(s) 710. Such logic and data transmitted to the container component can include but is not limited to services, routines, data and the like that enable management component 130 to install, configure, maintain and otherwise manage applications, services, routines and such on one or more other automation devices 720. Accordingly, automation logic and data can be transmitted, deleted, updated or otherwise modified on automation deice 720 via information system(s) 710. The automation device can then manage one or more other automation devices 720.

Figure 7B:
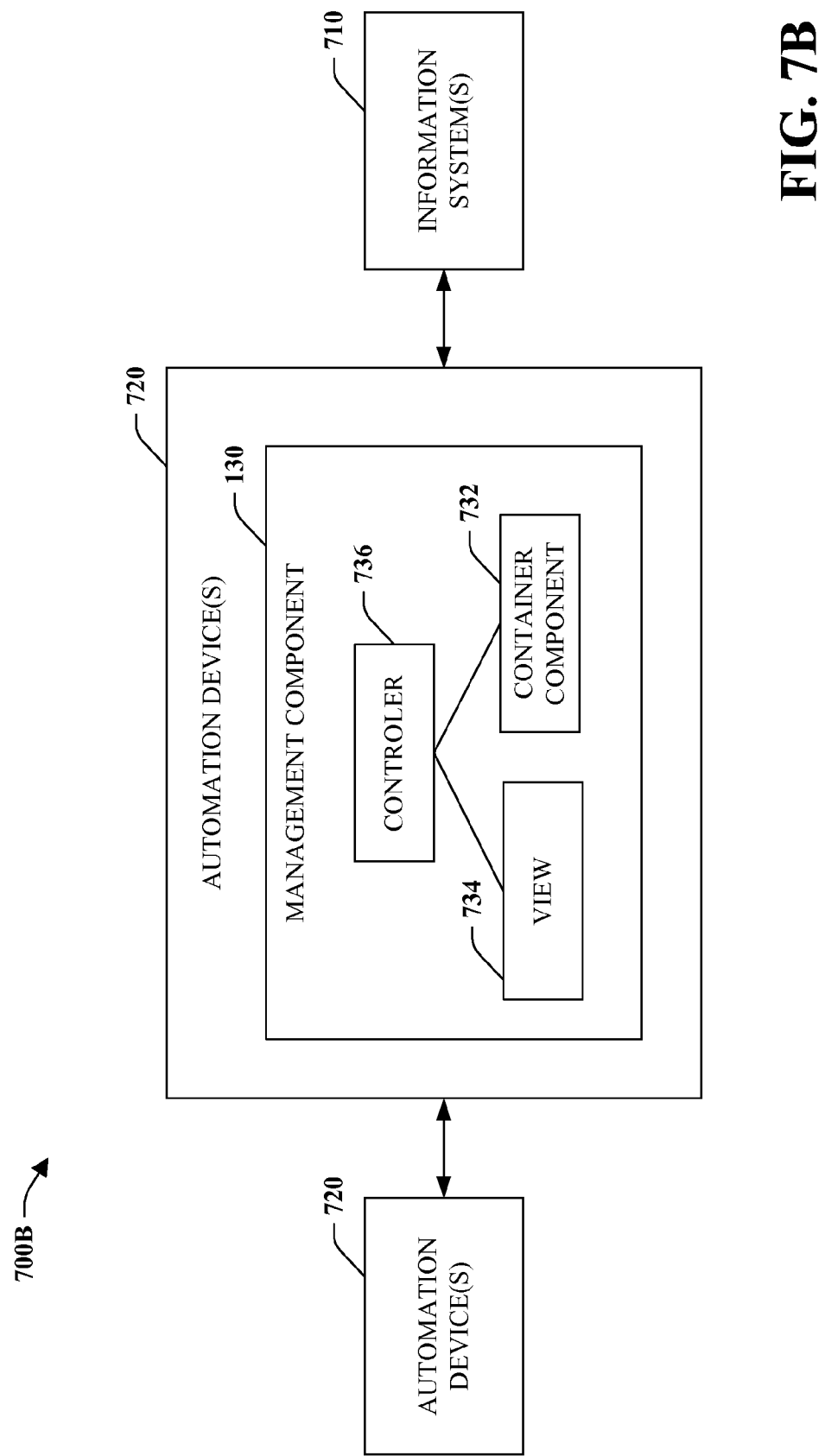
FIG. 7B illustrates an exemplary automation device interaction system.

Turning to FIG. 7B, an automation device interface 700B is depicted. System 700B provides an alternative implementation of system 700A described above. System 700B includes an information system(s) 710 and a plurality of automation devices 720. An information system(s) 710 can be or correspond to an enterprise system or server associated with or including a database system (not shown), for example, such a system can be a MER, MRP or ERP system, or simply an object or relational database management system, data store or application. The information system(s) 710 can include, among other things, applications, services and data. The information system(s) 710 can be communicatively coupled to one or more automation devices 720 including but not limited to a PLC, Ethernet module, or interface. Accordingly, information system(s) 710 can transmit applications, services, and/or data, among other things, to an automation device 720 such that the automation device could continue to operate even if the information system(s) 710 become unavailable (e.g., offline . . . ).

According to an aspect of the invention, at least one automation device can include a management component 130. The management component 130 can facilitate communication between a first automation device such as a PLC and one or more other automation devices 720. Among other things, management component 130 can aid loading, unloading, spawning, invoking, executing, pausing, publishing, retrieving, posting, and/or terminating the instruction(s), application routines, services data and the like. Furthermore, management component can facilitate passing parameters and/or variables to the instruction(s) and the like, and/or managing, modifying, overriding, moving, and/or removing the instruction(s), applications, services, routines data and so forth. The management component 130 can be implemented in accordance with a model, view, and controller (MVC) pattern. Hence, the management component 130 can include a container component 732 (model), a view component 734, and a controller component 736. The container component 732 can store automation logic and/or data received from the information system(s) 710 including many persistence models. Persistence models can include java beans using Java Database Connectivity (JDBC), session beans using JDBC, bean-managed persistence (BMP), session beans incorporating entity beans that include container-managed persistence (CMP). The automation logic can include applications, services, routines, and the like such as but not limited to those provided by ladder logic. View component 734 interacts with the container component 732 on behalf of another automation device 720. Controller component 736 controls the interaction or flow between the view component 734 and the container component 732. By way of example and not limitation, a first automation device such as a PLC can interact with a second automation device such as a human machine interface. The view component 734 can provide the interface and/or associated browser with automation data. Furthermore, the view component 734 could provide the interface with an applet or other program for execution. Such data can be provided to the view component 734 and subsequently to the interface by the controller component 736 and the container component 732. In another example, the second automation device could correspond to another PLC and the PLC could receive instructions such as ladder logic instructions from the view component 734 to execute.

Figure 8:
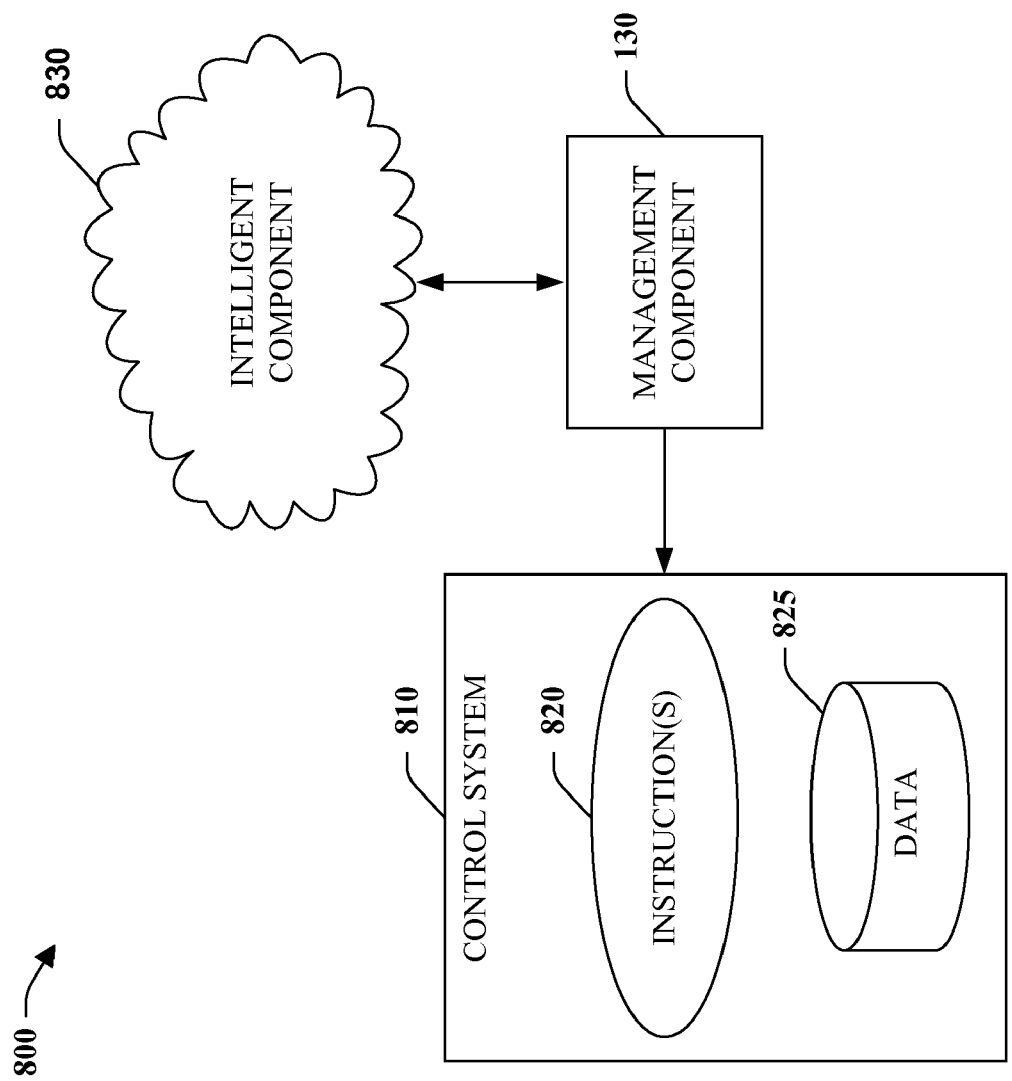
FIG. 8 illustrates an exemplary system that employs intelligence to facilitate managing communication with an industrial control system.

FIG. 8 illustrates a system 800 that employs intelligence to facilitate managing communication with an industrial control system. The system 800 includes a control system 810. It is to be appreciated that the control system 810 can include components such as industrial controllers (e.g., hard, soft and combination thereof), modules, scanners, bridges, agents, autonomous I/O, etc. that can be utilized individually and/or in combination to control processes, machines, manufacturing equipment, plants, and the like. The control system 810 further is associated with one or more instructions ("instruction(s)") 820, which can be generated via any programming language. In addition, the instruction(s) 820 can be associated with one or more binary files, ASCII files, source code, executables, classes, reliable messages, data structures, schema, objects, services, notifications, behaviors, alerts, timers, data etc. The control system 810 can also include data 825 persisted in one or more of files, addressable memory, relational and object databases, and the like. The instructions can interact with data, for instance, to produce useful results including operation of industrial automation control devices, systems or machines. Furthermore, control system 810 can include one or more of the components (e.g., map component, registry component, and persistence component) provide in control system 110 of FIG. 1, which have been omitted from this figure for purposes of brevity and clarity and not limitation. Additionally, control system 810 can also interact with one or more information systems as described with respect to system 100 of FIG. 1.

The system 800 further includes an intelligent component 830 and a management component 130 that can collectively be employed to interact with the control system 810. For example, the intelligent component 830 can assist the management component 130 with discovery of applications, software bundles, components and services; installing and uninstalling, binding and unbinding software components, registering and deregistering services, loading, unloading, spawning, invoking, executing, pausing and/or terminating the instruction(s) 820, passing parameters and/or variables to the instruction(s) 820, and/or managing, modifying, overriding and/or removing the instruction(s) 820, and/or reading and writing object persistence, mapping between object and relational data. In addition, the intelligent component 830 can provide a security mechanism that is utilized with any access to the control system 810.

The intelligent component 830 can employ various machine learning techniques, algorithms, approaches, etc. For example, the intelligent component 830 can employ a machine-learning algorithm that can reason about or infer from a set of observations, features, properties, and/or components. Inference can be employed to generate a probability distribution over the input data and/or identified components. Such inferences can be probabilistic—that is, the computation of a probability distribution over entities identified within the data. Inference can also refer to techniques employed for rendering higher-level decisions. Various classification (explicitly and/or implicitly trained) schemes and/or systems (e.g., support vector machines, neural networks, expert systems, Bayesian belief networks, fuzzy logic, data fusion engines . . . ) can be employed in connection with performing any or all of the above noted functions.

In general, a classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to automatically make decisions. One example of a suitable classifier is a support vector machine (SVM), which, in general, operates by finding a hypersurface in the space of possible inputs, wherein the hypersurface attempts to split triggering criteria from non-triggering criteria. This can make the classification suitable for testing samples, data, etc. that is near, but not identical to training data. Other directed and undirected model classification approaches include, naïve Bayes, Bayesian networks, decision trees, neural networks, fuzzy logic models, and probabilistic classification models providing different patterns of independence, for example. Classification as used herein also is inclusive of statistical regression that is utilized to develop models of priority.

The aforementioned systems have been described with respect to the interaction between several components and/or systems. It should be appreciated that such systems can include those components and/or systems specified therein, some of the specified components, and/or additional components specified in other systems. For example, interface control system 110 of FIG. 1 can include one or more of a registry component, a map component, a persistence component and/or any combination thereof. Additionally, it should be noted that one or more components may be combined into a single component to provide aggregate functionality or divided into several subcomponents. The components may also interact with or be integrated with one or more other components or systems not specifically described herein but known by those of skill in the art.

Figure 9:
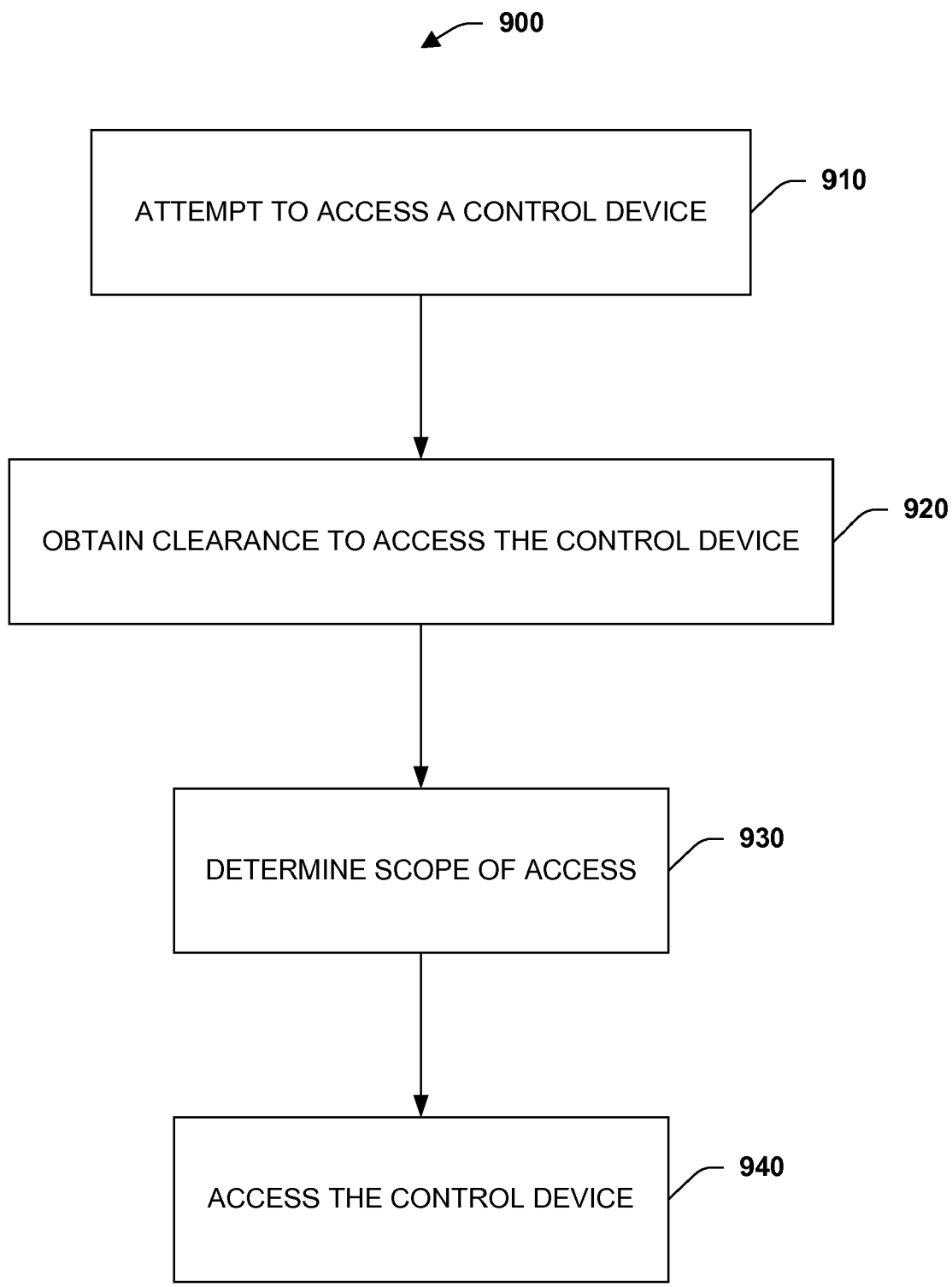
FIG. 9 illustrates an exemplary methodology for conveying information to a control device.
Figure 10:
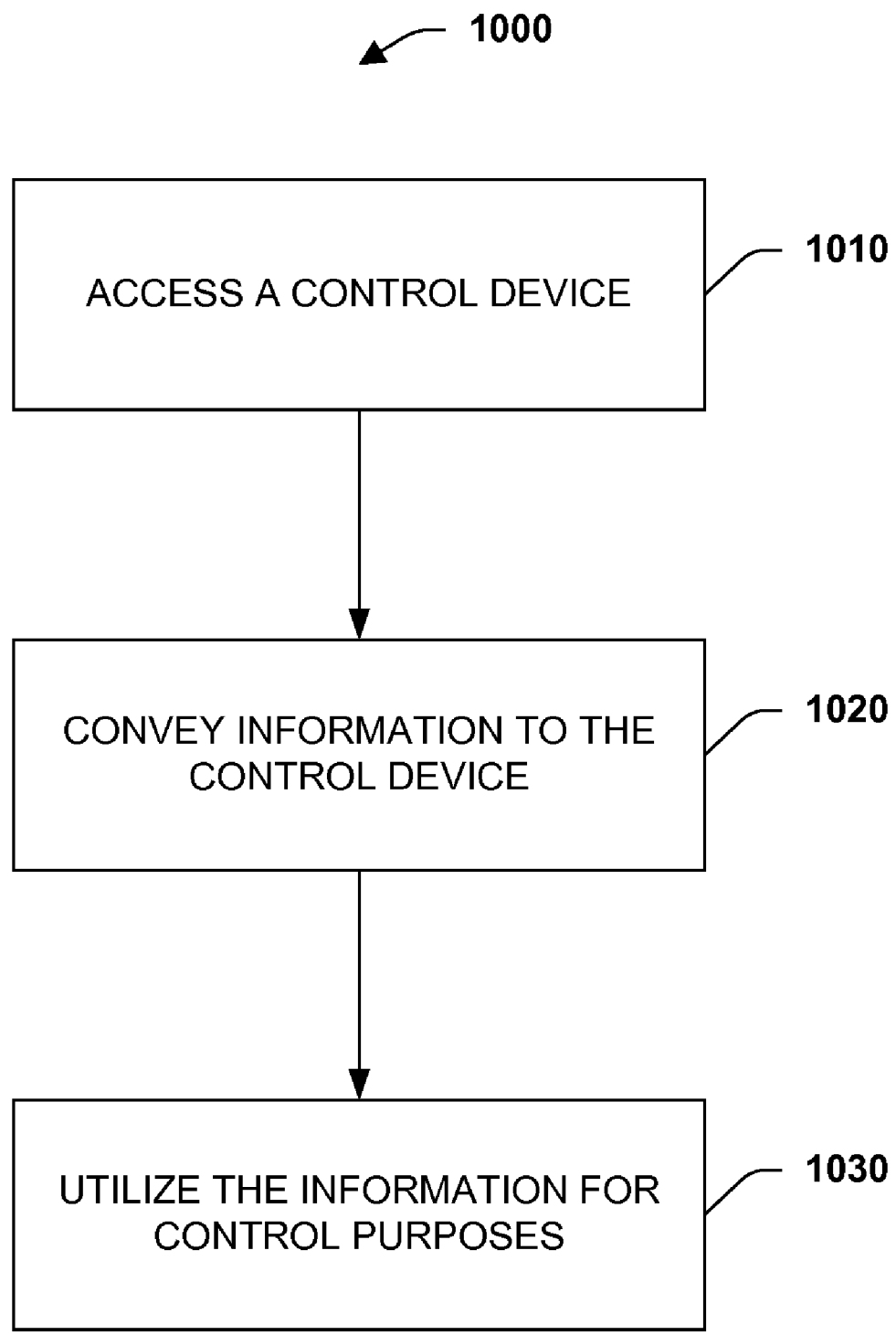
FIG. 10 depicts an exemplary methodology for utilizing information residing within a control device.
Figure 11:
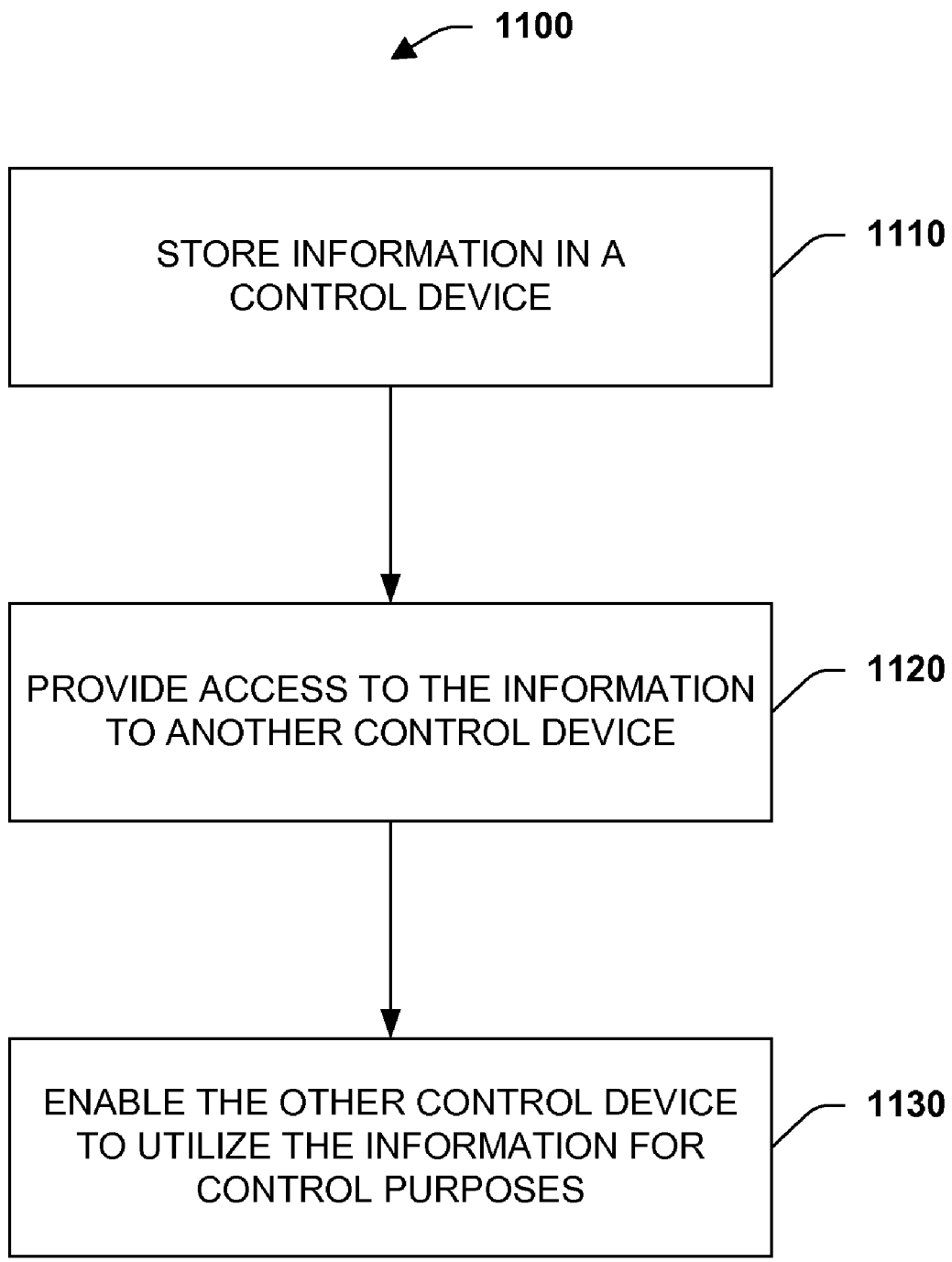
FIG. 11 illustrates an exemplary methodology for accessing information residing within a control device.

FIGS. 9-11 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 9 illustrates a methodology 900 for conveying information to a control device. At reference numeral 910, an entity such as a message broker, a control system, an industrial controller, a module, a SCADA, a MES, an ERP and/or a MC system, an application, an intelligent agent, autonomous I/O, a sensor network, a bridge, a scanner, an integration component, a database, a server, a client, a user, etc. attempts to access a control device such as an industrial controller, a module, an intelligent agent, autonomous I/O, a sensor network, a bridge, a scanner, etc. At 920, a security mechanism (if present) is utilized to determine whether such access is allowed. As noted above, suitable security mechanisms can include, but are not limited to, IPsec, SSL, SASL, Kerberos, LDAP, NTLM, Active Directory, etc. At 930, a scope of access is determined for an entity with access to the control device. As described herein, the scope can be based on identification, attributes, privileges, etc. At reference numeral 940, the entity can access the control device. For example, the entity can bind to software components, install and uninstall applications, services and components; register and deregister services; write, load, write over, store, push, etc. instructions and/or data to the control device. Such instructions can be utilized by the control device for various operations, while the data may contain configuration, provide object persistence, miscellaneous data related to control, quality, process, alarms, time, events.

FIG. 10 illustrates a methodology 1000 for utilizing information residing within a control device. At 1010, the control system can be accessed by an entity such as a message broker, a control system, an industrial controller, a module, a SCADA, a MES, an ERP and/or a MC system, an application, an intelligent agent, autonomous I/O, a sensor network, a bridge, a scanner, an integration component, a database, a server, a client, a user, etc. At reference numeral 1020, such entity can provide information such as instructions, reliable messages, programs, routines, files, executables, services, alerts, configuration, data etc. to the control device. At reference numeral 1030, the control device can access and/or leverage the provided information and/or other information residing and/or associated with the control device. Such access can include reading or writing to the control system data, reading or writing to a relational and/or object database, inter-process communication with executables in the control system, invoking, removing, executing, modifying, moving, deleting, terminating, pausing, any of the instructions, programs, routines, files, executables, services, alerts, data, configuration etc. It is to be appreciated that in aspects of the subject invention such information can be encrypted, digitally signed, encoded, compressed, password protected, etc.

FIG. 11 illustrates a methodology 1100 for accessing information residing within a control device. At reference numeral 1110, information such as instructions, programs, routines, files, executables, services, alerts, configuration, data etc. is stored on the control device. Such information can be encrypted, digitally signed, encoded, compressed, password protected, etc. and associated with one or more binary files, ASCII files, source code, executables, classes, data structures, schema, objects, services, notifications, behaviors, alerts, timers, etc. At reference numeral 1120, an entity such a message broker, a control system, an industrial controller, a module, a SCADA, a MES, an ERP and/or a MC system, an application, an intelligent agent, autonomous I/O, a sensor network, a bridge, a scanner, an integration component, a database, a server, a client, a user, etc. accesses the control device. It is to be appreciated that such access can be based on various security mechanisms as described herein. At 1130, the entity utilizes the access to uncompress, install and uninstall, load, unload, spawn, invoke, execute, pause, terminate, pass parameters and/or variables to, and/or manage, modify, override and/or remove the instructions, programs, routines, files, executables, services, alerts, configuration, data, etc.

Figure 12:
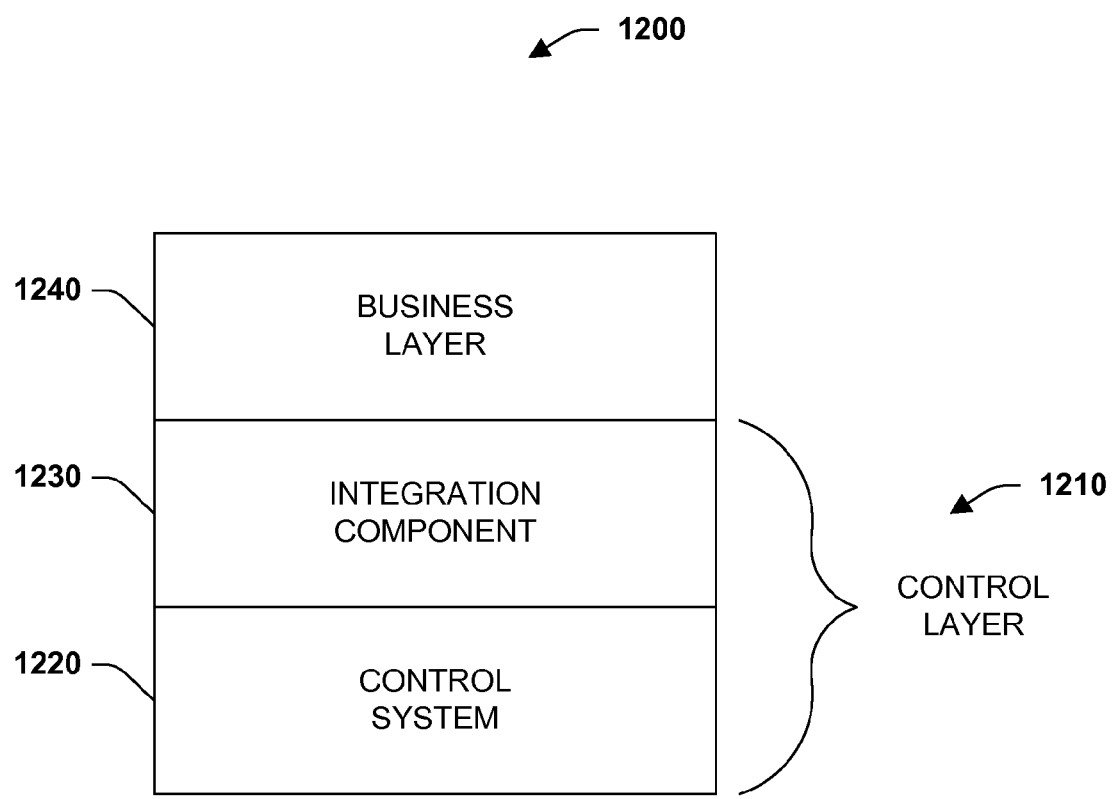
FIG. 12 illustrates an exemplary architecture for integrating control and business layers.

FIG. 12 illustrates an architecture 1200 that integrates control and business layers. The architecture 1200 includes a control layer 1210. As depicted, the control layer 1210 includes a control system 1220 and an integration component 1230. The control system 1220 and/or the integration component 1230 of the control layer can include one or more messaging brokers (not shown) or device management applications such as IBM WebSphere® Everyplace™ Device Manager (WEDM) V5 application management as described herein. As described above, the messaging brokers can provide for reliable messaging within and/or outside of the control layer 1210. The system 1200 further includes a business layer 1240. Likewise, the one or more messaging brokers (not shown) can reside within the business layer 1240, and provide for reliable messaging with the control layer 1210.

Figure 13:
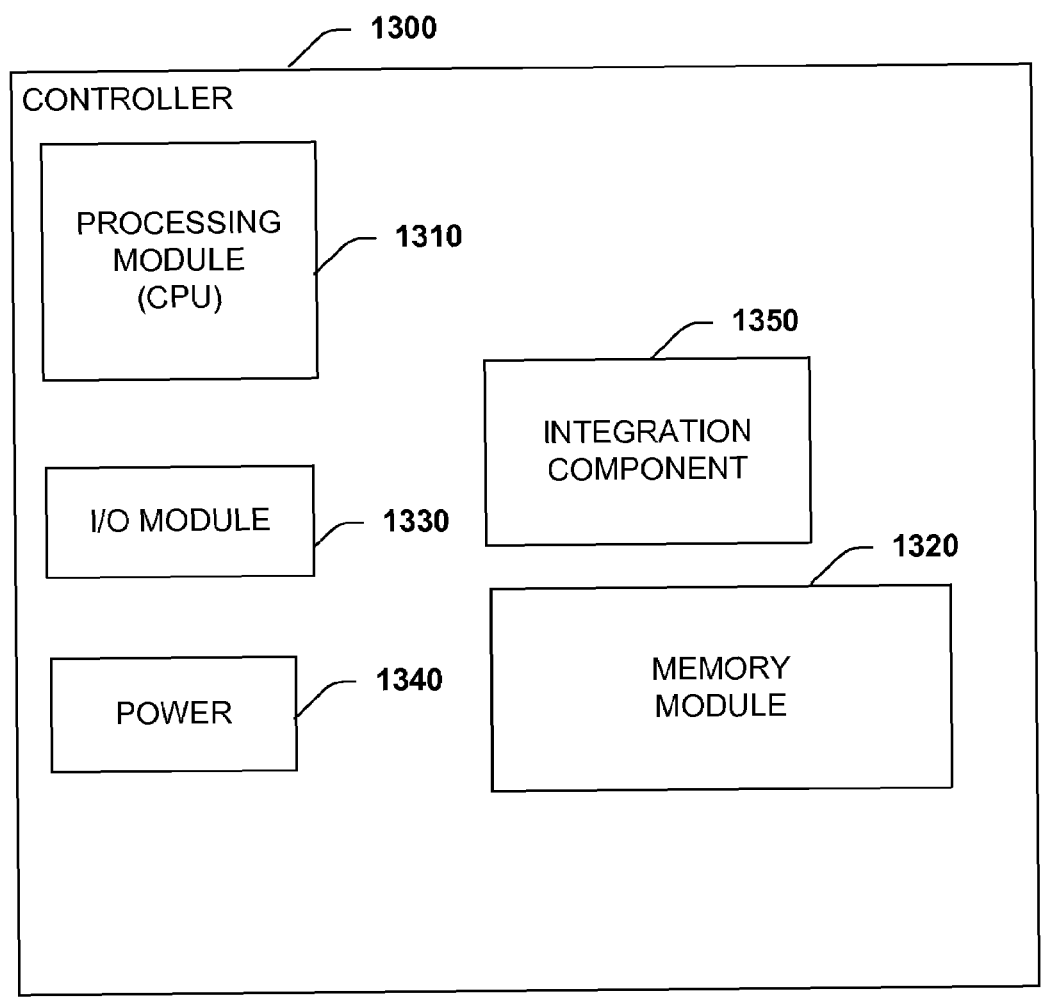
FIG. 13 illustrates an exemplary industrial controller in accordance with an aspect of the invention.

FIG. 13 illustrates an exemplary industrial controller 1300 in accordance with an aspect of the invention. The industrial device 1300 can be a programmable logic controller (PLC), and the like. A typical industrial controller is a special purpose processing device for controlling (e.g., automated and semi-automated) industrial processes, machines, manufacturing equipment, plants, and the like. The industrial controller 1300 can include one or more modules such as a processing module 1310, a memory module 1320, and an I/O module 1330. In addition, the industrial controller 1300 can include a power component 1340 that energizes the components 1310-1330. In addition, these components may be virtualized by applications, processes, and threads running on a computer.

The processing module 1310 can be utilized to execute control applications, end-user programs and associated instructions, which can be stored within the memory module 1320 or memory external to the industrial controller 1300. It should be appreciated that the memory module 1320 can refer to both volatile and non volatile storage including RAM, FLASH, disk, Storage Area Network (SAN), Network Attached Storage (NAS), iSCSI interface etc. Such control programs can be utilized to measure one or more process variables or inputs representative of the status of a controlled process and/or effectuate outputs associated with control of the process through the I/O module 1330 (which may be local and/or networked). The inputs and outputs can be digital and/or analog, assuming a continuous range of values. For example, an input channel of the I/O memory 1330 can be employed to receive analog and digital signals through sensors, switches and the like to provide information indicative of state and/or relating to a process, whereas an output channel can be utilized to convey a next state to an entity under the control of the controller. An output of the I/O module 1330 can interface directly with a controlled process by providing an output from memory to an actuator such as a motor, drive, valve, solenoid, and the like, RFID (tag, reader, printer . . . ), etc. Both inputs and outputs can be recorded in the I/O memory 1320.

A typical control routine can be created in a controller configuration environment that has various tools and interfaces whereby a developer can construct and implement a control strategy using industrial and conventional programming languages or graphical representations of control functionality. Such control routine can be downloaded from the configuration system into the controller memory module 1320 for implementation of the control strategy in controlling a process or machine. The controller 1300 further includes an integration component 1350, which can provide a network interface (e.g., TCP/IP, UDP/IP, IPv4, IPv6 . . . ) interface, execution environment like a JVM (Java Virtual Machine), and/or operating system, data along with integrated and plug in applications and/or protocols that interface with information systems, business systems, integration servers, web servers, and/or databases associated therewith, as described in detail herein.

Figure 14:
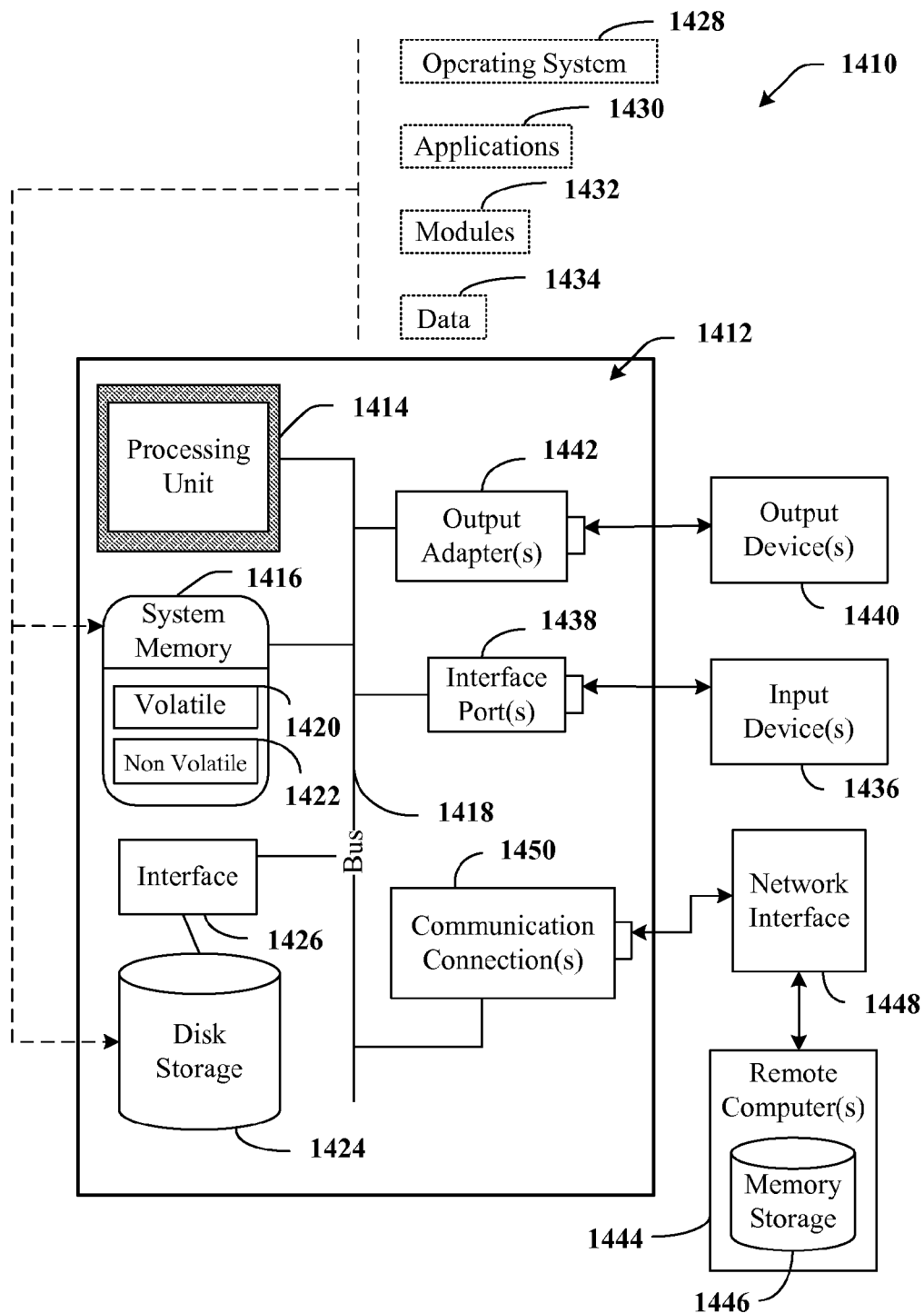
FIG. 14 illustrates an exemplary computing architecture that can be employed in connection with the subject invention.
Figure 15:
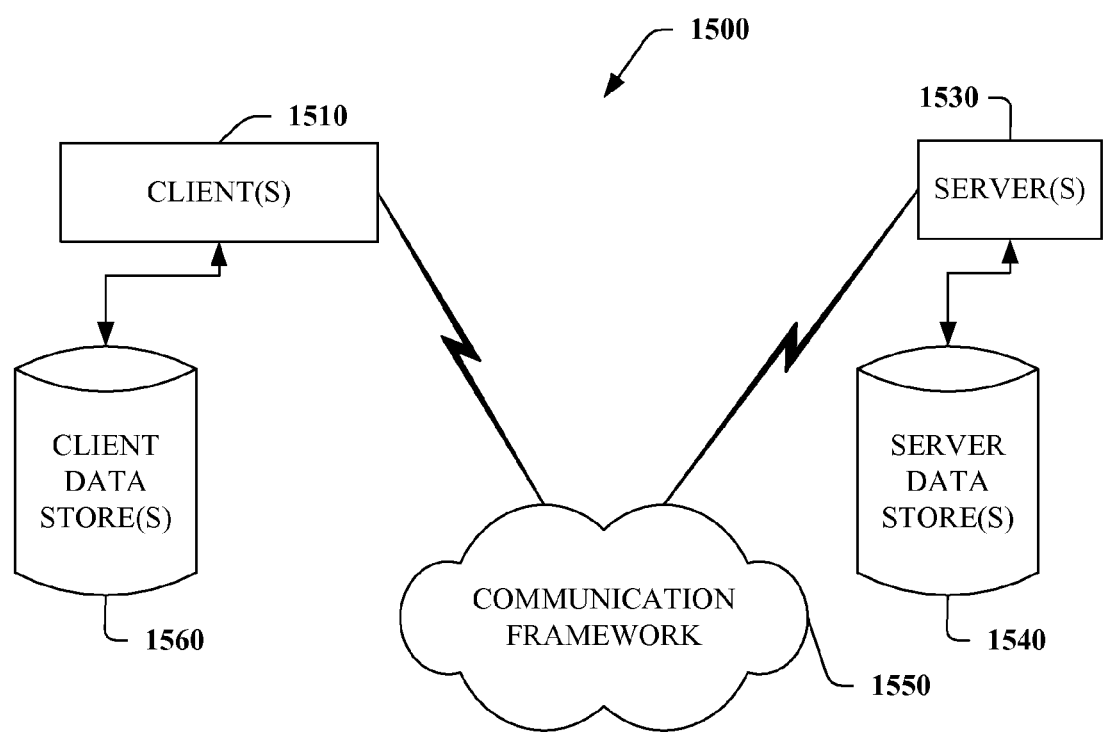
FIG. 15 illustrates an exemplary networking environment that can be employed in connection with the subject invention.

In order to provide a context for the various aspects of the invention, FIGS. 14 and 15 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426. It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424.

It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN), and mesh networks. LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit-switching networks like Integrated Services Digital Networks (ISDN) and variations thereon, packet switching networks, and Digital Subscriber Lines (DSL). Mesh networks include, but are not limited to networks like ZigBee, IEEE 802.15.4.

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems, and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the present invention, for example. One possible communication between a client 1510 and a server 1530 can be in the form of a data packet that can be transmitted between two or more computer processes. The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates interaction between industrial control components, comprising:
    a management component that facilitates execution of at least one of one or more instructions or data operating within an execution environment associated with a first industrial control component, by a second industrial control component.

2. The system of claim 1, wherein the management component interacts with one or more of data files, configurations, and objects persisted in a database management system that is remote to the first industrial control component.

3. The system of claim 1, wherein the management component includes a map component that maps data between local and remote databases, the data resides in at least one of memory, data files, object database management system(s) (ODBMS) or relational database management system(s) (RDBMS).

4. The system of claim 1, wherein the management component is resident on the second industrial control component.

5. The system of claim 1, wherein the second industrial control component is one of a hard controller, a soft controller, a Human Machine Interface (HMI), an agent, autonomous I/O, a module, a Supervisory Control And Data Acquisition (SCADA) system, Manufacturing Execution System (MES), an Enterprise Resource Planning (ERP) system, a Master Control (MC) system, an application, a sensor network, a bridge, a scanner, a database, a server or a client.

6. The system of claim 1, further comprising a security component that at least one of denies, provides or revokes access to the first industrial control component by the second industrial control component.

7. The system of claim 6, wherein the security component defines a scope of access to the second industrial control component, the scope of access is at least one of application specific or extensible.

8. The system of claim 6, wherein the security component authenticates and authorizes the second industrial control component to access the first industrial control component.

9. The system of claim 1, wherein the management component deploys the at least one of one or more instructions or data that comprise a service on the first industrial control component.

10. The system of claim 1, wherein the management component reads or writes data on the first industrial control component.

11. The system of claim 1, wherein the management component and provides information necessary for a service associated with the one or more instructions.

12. The system of claim 1, wherein the management component removes at least one of the one or more instructions or data that comprise a service from the first industrial control component.

13. The system of claim 1, wherein the management component receives at least one of instructions or data from a high-level information system including one or more of an MES system, ERP system, and object or relational databases.

14. The system of claim 1, wherein the first industrial control component is one of a hard controller, a soft controller, a module, a scanner, a bridge, a Human Machine Interface (HMI), an agent, or an autonomous I/O.

15. The system of claim 1, wherein the one or more instructions are associated with at least one of a reliable message, a binary file, an ASCII file, source code, an executable, a class, a data structure, a schema, an object, a service, a notification, a behavior, an alert, a PLC program, or a timer.

16. The system of claim 1, wherein the management component further enables the second industrial control component to at least one of install, uninstall, register, deregister, load, unload, spawn, invoke, pause, publish, post, search, query, retrieve, move, modify, copy, override, or terminate at least one instruction, application or service deployed on the first industrial control component.

17. The system of claim 1, wherein the management component further enables the second industrial control component to at least one of install, uninstall, register, deregister, load, unload, spawn, invoke, publish, post, search, query, retrieve, move, modify, copy, or override at least one data value, variable, data reference, database value, configuration or file stored on the first industrial control component.

18. The system of claim 1, wherein the management component further enables the second industrial control component to pass at least one of a parameters or a variable to the one or more instructions.

19. The system of claim 1, wherein the management component further enables the second industrial control component to at least one of read or write to an object persistence store, or provide persistence to an object used to execute code related to the execution of the one or more instructions.

20. The system of claim 1, wherein the management component further enables the second industrial control component to at least one of read or write data employed for persistence or configuration of an industrial component, the data includes at least one of a data object, code object, java class or object, java bean, container, or variable to the one or more instructions.

21. The system of claim 1, wherein the at least one of one or more instructions or data is at least one of encrypted, digitally signed, encoded, compressed, or password protected.

22. An industrial automation device interaction system comprising:
    a first industrial automation device; and
    a management component included within the first industrial automation device that interacts with automation logic or processes data at least one of provided to, removed from or stored on at least a second industrial automation device.

23. The system of claim 22, further comprising a container component included within the first industrial automation device from which at least one of automation logic or data is at least one of added or removed by the management component.

24. The system of claim 23, wherein the at least one of automation logic or data is encapsulated by one or more software components.

25. The system of claim 23, further comprising one or more information systems communicatively coupled to the first industrial automation device that provide the at least one of automation logic or data to the management component.

26. The system of claim 25, wherein the one or more information systems includes at least one of a database system, an MES system, an MRP system, or an ERP system.

27. A method for executing a service in a first control device by a second control device, comprising:
    storing at least one service on the first control device; and
    managing the execution of the at least one service by the second control device in an execution environment of the first control device.

28. The method of claim 27, wherein the storing the at least one service includes storing at least one of a reliable message, a binary file, an ASCII file, source code, an executable, a class, a data structure, a schema, an object, a service, a notification, a behavior, an alert, or a timer.

29. The method of claim 27, further comprising utilizing the second control device to at least one of load, unload, spawn, invoke, pause, publish, post, search, query, retrieve, move, modify, copy, override, or terminate the at least one service deployed on the first control device.

30. The method of claim 27, further comprising utilizing the second control device to pass at least one of a parameter or a variable to the at least one service for execution on the first control device.

31. The method of claim 27, further comprising utilizing the second control device to provide object persistence to the at least one service.

32. The method of claim 27, further comprising at least one of authenticating or authorizing the second control device to utilize the execution environment to execute the at least one service.

33. The method of claim 27, wherein the storing at least one service includes storing a service that is at least one of encrypted, digitally signed, encoded, compressed, or password protected.

34. The method of claim 27, further comprising transmitting data that is at least one of encrypted, digitally signed, encoded, compressed, or password protected to the first control device via the second control device.

35. The method of claim 27, further comprising simultaneously providing the at least one service to the first control device and at least one other device.

36. The method of claim 27, wherein the storing at least one service includes storing a service that is associated with at least one of a diagnostic, a firmware update, a protocol conversion, or a custom-written service.

37. The method of claim 27, wherein the storing at least one service includes storing a service that performs a portion of a control function.

38. A system that facilitates interaction between industrial control components, comprising:
    means for deploying at least one instruction in a first industrial control component with an execution environment; and
    means for interfacing a second industrial control component to utilize the execution environment of the first industrial control component to run the at least one instruction.

* * * * *